United States Patent
Gan et al.

(10) Patent No.: US 6,844,115 B2
(45) Date of Patent: Jan. 18, 2005

(54) HIGHLY CONDUCTIVE AND STABLE NONAQUEOUS ELECTROLYTE FOR LITHIUM ELECTROCHEMICAL CELLS

(75) Inventors: Hong Gan, East Amherst, NY (US); Esther S. Takeuchi, East Amherst, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 164 days.

(21) Appl. No.: 10/287,395

(22) Filed: Nov. 4, 2002

(65) Prior Publication Data

US 2003/0134204 A1 Jul. 17, 2003

Related U.S. Application Data

(60) Provisional application No. 60/332,728, filed on Nov. 5, 2001.

(51) Int. Cl.[7] .............................................. H01M 6/16
(52) U.S. Cl. ...................... 429/332; 429/330; 429/333; 429/335; 429/231.2; 429/231.5; 429/219; 429/231.8; 429/220; 429/221; 429/224; 429/231.1; 429/232; 429/231.95
(58) Field of Search ................................ 429/330, 332, 429/333, 335, 231.2, 231.5, 219, 231.8, 220, 221, 224, 231.1, 232, 231.95

(56) References Cited

U.S. PATENT DOCUMENTS

| | | | |
|---|---|---|---|
| 4,252,876 A | 2/1981 | Koch | |
| 4,546,057 A | 10/1985 | Broussely et al. | |
| 4,713,305 A | 12/1987 | von Alpen | |
| RE33,306 E | 8/1990 | Hayashi et al. | |
| 4,952,330 A | 8/1990 | Leger et al. | |
| 5,272,022 A | 12/1993 | Takami et al. | |
| 5,296,318 A | 3/1994 | Gozdz et al. | |
| 5,407,762 A | 4/1995 | Mitate et al. | |
| 5,443,929 A | 8/1995 | Yamamoto et al. | |
| 5,472,810 A | 12/1995 | Takeuchi et al. | |
| 5,478,673 A | 12/1995 | Funatsu | |
| 5,516,340 A | 5/1996 | Takeuchi et al. | |
| 5,595,841 A | 1/1997 | Suzuki | |
| 5,626,985 A | 5/1997 | Shoji et al. | |
| 5,654,114 A | 8/1997 | Kubota et al. | |
| 5,766,797 A | 6/1998 | Crespi et al. | |
| 5,776,635 A | 7/1998 | Gan et al. | |
| 6,692,543 B1 * | 2/2004 | Hamano et al. | ............ 429/306 |
| 2001/0018152 A1 | 8/2001 | Kida et al. | |

FOREIGN PATENT DOCUMENTS

| | | |
|---|---|---|
| EP | 0 829 911 A2 | 3/1998 |
| EP | 0 829 911 A3 | 3/1999 |

OTHER PUBLICATIONS

Lithium Cycling Efficiency of Ternary Solvent Electrolytes with Ethylene Carbonate–Dimethyl Carbonate Mixture—Journal of Power Sources 68 (1997) 492–496—Yukio Sasaki. Mamoru Hosov, Minoru Handa.

* cited by examiner

*Primary Examiner*—Laura Weiner
(74) *Attorney, Agent, or Firm*—Michael F. Scalise

(57) ABSTRACT

The present invention is directed to at least partially replacing PC and/or DME with a linear carbonate, preferably dimethyl carbonate, and a linear mono-ether, the most preferred being diisopropyl ether, in electrolytes useful for activating alkali metal-containing cells. This electrolyte has improved conductivity and provides electrochemical cells with enhanced discharge performance. A most preferred electrolyte comprises 1,2-dimethoxyethane, propylene carbonate, dimethyl carbonate and diisopropyl ether.

54 Claims, 8 Drawing Sheets

HIGHLY CONDUCTIVE AND STABLE NONAQUEOUS ELECTROLYTE FOR LITHIUM ELECTROCHEMICAL CELLS

CROSS REFERENCE TO RELATED APPLICATION

This application claims priority based on provisional application Ser. No. 60/332,728, filed Nov. 5, 2001.

BACKGROUND OF THE INVENTION

1. Field of the Invention

This invention generally relates to the conversion of chemical energy to electrical energy. More particularly, the invention relates to both primary and secondary non-aqueous electrolyte lithium-containing electrochemical cells. Such cells are typically used to power implantable medical devices, for example cardiac defibrillators. In particular, the invention relates to a quaternary solvent system including a cyclic carbonate, linear di-ether, linear carbonate and linear mono-ether. The solvent system provides an electrolyte having higher conductivity than conventional solvent electrolytes.

2. Prior Art

The successful production of lithium electrochemical cells and their widespread application are largely dependent on the development of highly conductive and stable non-aqueous organic electrolytes. Non-aqueous organic electrolytes are composed of a salt dissolved in an organic solvent system of either a single solvent or mixed solvent. A general requirement of non-aqueous organic electrolytes is that they be reductively and oxidatively stable towards both anode active materials, for example, lithium metal and lithiated carbon, and typically used cathode active materials, for example, silver vanadium oxide (SVO), copper silver vanadium oxide (CSVO), fluorinated carbon ($CF_x$), manganese oxide ($MnO_2$), cobalt oxide ($CoO_2$), and others. For a high rate lithium cell application, an activating electrolyte with high conductivity is especially significant. To achieve high electrolyte conductivity, a combination of two solvents, one with a high dielectric constant and one with a low viscosity, is generally used.

Many lithium salts and organic solvents have been successfully used in lithium electrochemical cells including $LiAsF_6$, $LiPF_6$, $LiBF_4$, $LiClO_4$, $LiSO_3CF_3$, among others. Typically used solvents include propylene carbonate (PC), ethylene carbonate (EC), γ-butyrolactone (GBL), sulfolane, 1,2-dimethoxyethane (DME), dimethyl carbonate (DMC), tetrahydrofuran (THF), diisopropyl ether (DIPE) 1,3-dioxolane, and others. One particularly stable and highly conductive electrolyte is 1.0 M $LiAsF_6$ or $LiPF_6$ in PC:DME=1:1. This electrolyte is widely used in the battery industry. A particularly common application is in a high rate Li/SVO defibrillator cell using $LiAsF_6$ as the preferred electrolyte salt.

Despite the success of 1.0 M $LiAsF_6$/PC:DME=1:1 electrolyte, a better electrolyte with higher conductivity and stability is needed in the present investigation for high rate, high power, and high capacity electrochemical cells. It is interesting to note that the above-discussed electrolyte using a PC/DME solvent system does not provide maximum conductivity at its one-to-one volume ratio. As shown in FIG. 1, the maximum conductivity of 1.0 M $LiAsF_6$ in PC/DME is at a volume ratio of 20:80. The conductivity of DME of about 19.5 mmho/cm at 37° C. is about 12.4% higher than that of the PC at 17.3 mmho/cm at 37° C.

The benefit of using an electrolyte of 1.0 M $LiAsF_6$ dissolved in a solvent system of PC:DME at a volume ratio less than 5:5, i.e., down to 2:8, which has a higher conductivity, seems obvious for high rate lithium electrochemical cells. However, an acceptable electrolyte must provide both high conductivity and high stability toward both the cathode and the anode. The first requirement of a good electrolyte is to significantly reduce or minimize the internal resistance (IR) voltage drop during high current pulse discharge. The second requirement is to minimize the impedance build-up at the solid electrolyte interface (SEI) at the anode and the cathode. Therefore, high electrolyte conductivity does not necessarily mean better cell performance or improved discharge capacity. Indeed, when electrolytes of 1.0 M $LiAsF_6$/PC:DME=4:6 or 3:7 are used in Li/SVO cells, the benefit of their high conductivity in a short term discharge test is completely canceled by the presence of larger voltage delay during high current pulse discharge applications.

It is believed that voltage delay in Li/SVO cells is caused by the dissolution of vanadium ions from the cathode into the electrolyte, which then re-deposit on the anode surface by reduction to produce a highly resistant surface film. The ion dissolution process is catalyzed by the presence of DME, which is a very good ligand molecule. This linear ether has a larger donation number (DN=20) than the does propylene carbonate having DN=15.1. The donation number signifies the potential of a nucleophile molecule to donate an electron pair as described in the Lewis acid-base theory. To minimize or even eliminate the voltage delay phenomenon, a lower percentage of DME in the electrolyte solvent mixture is desired. This decreases the content of DME with a high DN. However, by reducing the percentage of DME, the electrolyte conductivity is also decreased. Therefore, the electrolyte of 1.0 M $LiAsF_6$/PC:DME=1:1 typically used to activate Li/SVO cells is a balanced choice of maximizing the solvent system conductivity and contemporaneously minimizing the undesirable effect of dissoluted vanadium ions in the electrolyte.

Although the 1.0 M $LiAsF_6$/PC:DME=1:1 satisfies the present requirements in defibrillator cell applications, it slowly decomposes to form a relatively highly resistive surface film on the Li/SVO cell electrodes at certain discharge values, as signified by the voltage delay phenomena. For longer-term cell storage or usage, this phenomenon becomes more obvious and severe.

The invention of CSVO as a new cathode active material is important in the pursuit of the next generation high energy density and high power electrochemical cells. Copper silver vanadium oxide provides about 7% to 15% more capacity per gram than conventionally SVO cathode materials. This cathode material is described in U.S. Pat. Nos. 5,670,276 and 5,516,340, both to Takeuchi et al. These patents are assigned to the assignee of the current invention and incorporated herein by reference. In order to fully realize the improved capacity benefits of CSVO, however, a new electrolyte system that is more conductive and more stable toward both SVO and CSVO active cathode materials is needed.

One recently developed electrolyte system includes the ternary solvents of PC (cyclic carbonate), DME (linear di-ether) and DMC (linear carbonate). The latter compound has a dissociation number of about 15. Electrolytes made with this solvent system have significantly higher conductivities than that of the standard binary solvent (PC:DME= 1.1) electrolyte, while functioning fairly well under discharge conditions to which Li/SVO cells are typically subjected. However, PC:DME:DMC electrolyte systems have shown instability under certain experimental conditions. Thus, although this ternary solvent electrolyte is commonly used to activate Li/SVO cells, there are some applications for which it is not useful.

To remedy the instability problem of PC:DME:DMC, another ternary solvent electrolyte system was developed and is described by U.S. Pat. No. 5,776,635 to Gan et al. This patent is assigned to the assignee of the current invention and incorporated herein by reference. The solvent system includes PC, DME, and (DIPE). Diisopropyl ether has a dissociation number of less than 19. Both Li/SVO and Li/CSVO cells activated with this electrolyte system exhibit very good chemical and electrochemical stability in comparison to electrolytes of PC:DME as well as the newer PC:DME:DMC electrolyte systems. Even though this electrolyte system is advantageous in terms of its long-term performance and stability in Li/SVO and Li/CSVO primary cells, its conductivity is only comparable to that of the standard binary solvent electrolyte of PC:DME. Thus, an electrolyte system is needed that is stable chemically and electrochemically while having a higher conductivity than the conventional binary solvent electrolyte.

Accordingly, the present invention is directed to an electrolyte system that is more conductive than the conventional binary solvent electrolyte while being chemically and electrochemically stable toward Li/SVO and Li/CSVO primary electrochemical systems as well as secondary lithium ion chemistries.

SUMMARY OF THE INVENTION

In the present invention, the advantage of using DMC (a linear dialkyl carbonate) co-solvent to increase electrolyte conductivity and the advantage of using DIPE (a linear mono-ether) to improve the chemical and electrochemical stability of the electrolyte are combined. Partial replacement of the cyclic carbonate (PC) and linear di-ether (DME) in the conventional electrolyte with linear carbonate (DMC) and linear mono-ether (DIPE) improves electrolyte conductivity significantly. Since both DMC and DIPE have a smaller DN number than that of DME, voltage delay problem is minimized as well. The present electrolytes are useful in all types of primary and secondary lithium or lithium ion cells, in addition to those used to power implantable medical devices. In cardiac defibrillators, pulse voltage drop and voltage delay under high current pulse discharge conditions is minimized in cells activated with the present electrolytes.

The features of the current invention will, therefore, be apparent upon consideration of the following description thereof presented in conjunction with the following drawings and the attached detailed description of the preferred embodiment.

DETAILED DESCRIPTION OF THE PREFERRED EMBODIMENTS

Figure 1:
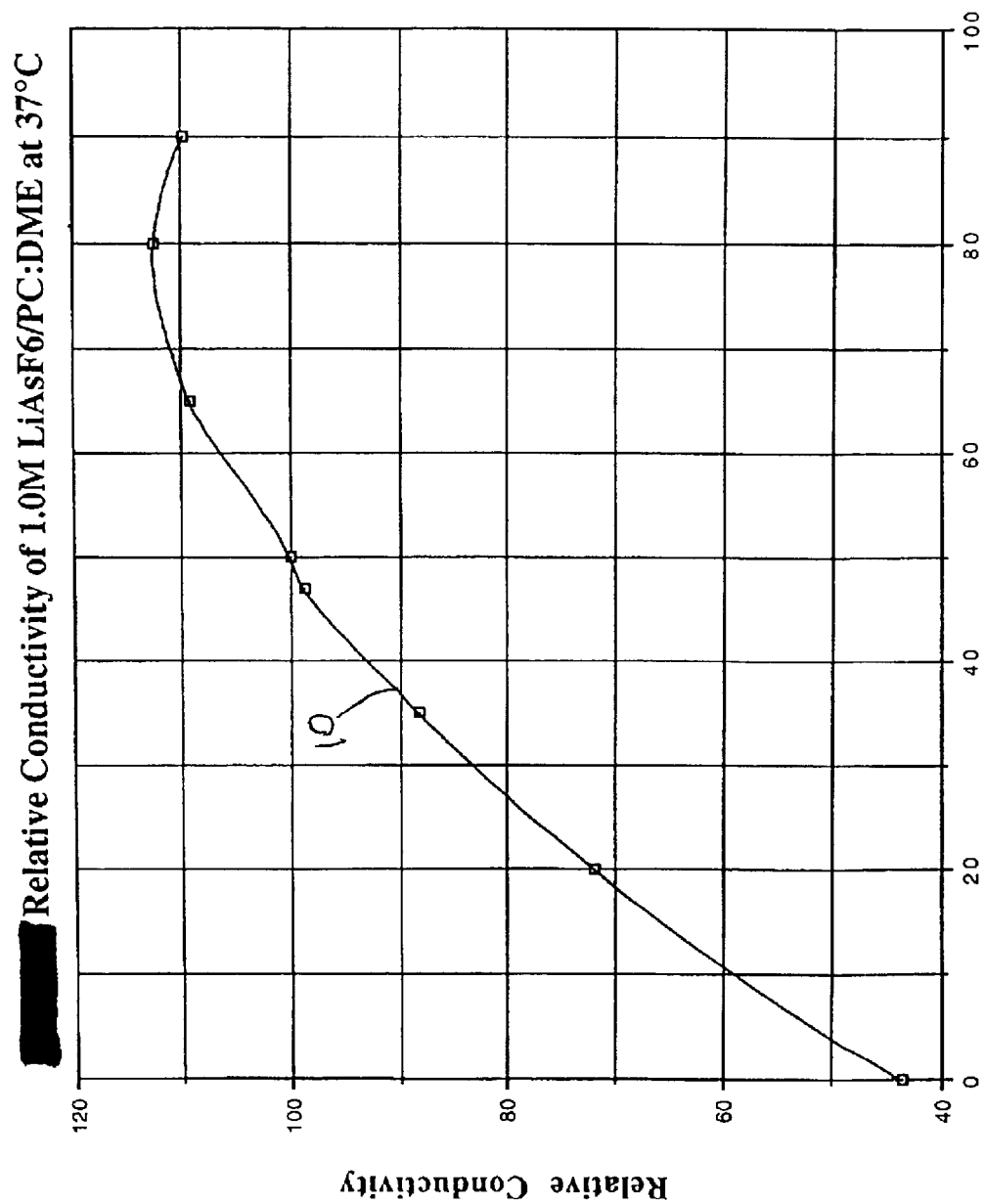
FIG. 1 is a graph of the relative conductivity of 1.0 M LiAsF$_6$ in a binary mixture of PC:DME at various percentages of DME at 37° C.

As used herein, the term "pulse" means a short burst of electrical current of significantly greater amplitude than that of a pre-pulse current immediately prior the pulse. A "pulse train" consists of at least two pulses of electrical current delivered in relatively short succession with or without open circuit rest between the pulses. Current pulses range from about 15 mA/cm$^2$ to about 50 mA/cm$^2$ with an exemplary pulse train consisting of four 10-second pulses (23.2 mA/cm$^2$) with a 15 second rest between each pulse.

In this disclosure, all solvent percentages are listed in volume percent. In each of the tables, P(pre1) indicates the cell voltage prior to the application of the pulse train. Pulse 1 min signifies the minimum voltage during the first pulse of a pulse train (PT), whereas P(4 min) indicates the minimum voltage of the fourth pulse of the pulse train.

The electrochemical cell of the present invention is of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B, Li—Mg and Li—Si—B alloys and intermetallic compounds. The preferred metal comprises lithium. An alternate negative electrode comprises a lithium alloy, such as lithium-aluminum alloy. The greater the amounts of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode includes a current collector, preferably of nickel, having an extended tab or lead contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) that are capable of reversibly retaining the lithium species is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties that permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In either the primary cell or the secondary cell, the reaction at the positive electrode involves conversion of ions that migrate from the negative electrode to the positive electrode into atomic or molecular forms. For a primary cell, the cathode active material comprises at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide or a fluorinated carbon.

The metal oxide or the mixed metal oxide is produced by the chemical addition, reaction, or otherwise intimate contact of various metal oxides, metal sulfides and/or metal elements, preferably during thermal treatment, sol-gel formation, chemical vapor deposition or hydrothermal synthesis in mixed states. The active materials thereby produced contain metals, oxides and sulfides of Groups IB, IIB, IIIB, IVB, VB, VIB, VIIB and VIII, which include the noble metals and/or other oxide and sulfide compounds. A preferred cathode active material is a reaction product of at least silver and vanadium.

One preferred mixed metal oxide is a transition metal oxide having the general formula $SM_xV_2O_y$ where SM is a metal selected from Groups IB to VIIB and VIII of the Periodic Table of Elements, wherein x is about 0.30 to 2.0 and y is about 4.5 to 6.0 in the general formula. By way of illustration, and in no way intended to be limiting, one exemplary cathode active material comprises silver vanadium oxide having the general formula $Ag_xV_2O_y$ in any one of its many phases, i.e., β-phase silver vanadium oxide having in the general formula x=0.35 and y=5.8, γ-phase silver vanadium oxide having in the general formula x=0.80 and y=5.40 and ε-phase silver vanadium oxide having in the general formula x=1.0 and y=5.5, and combination and mixtures of phases thereof. For a more detailed description of such cathode active materials, reference is made to U.S. Pat. No. 4,310,609 to Liang et al., which is assigned to the assignee of the present invention and incorporated herein by reference.

Another preferred composite transition metal oxide cathode material includes $V_2O_z$ wherein $z \leq 5$ combined with $Ag_2O$ having silver in either the silver(II), silver(I) or silver(0) oxidation state and CuO with copper in either the copper(II), copper(I) or copper(0) oxidation state to provide the mixed metal oxide having the general formula $Cu_xAg_yV_2O_z$, (CSVO). Thus, the composite cathode active material may be described as a metal oxide-metal oxide-metal oxide, a metal-metal oxide-metal oxide, or a metal-metal-metal oxide and the range of material compositions found for $Cu_xAg_yV_2O_z$ is preferably about $0.01 \leq z \leq 6.5$. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode material is prepared in an oxidizing atmosphere such as air or oxygen, or in an inert atmosphere such as argon, nitrogen and helium. For a more detailed description of this cathode active material, reference is made to U.S. Pat. No. 5,472,810 to Takeuchi et al. and U.S. Pat. No. 5,516,340 to Takeuchi et al., both of which are assigned to the assignee of the present invention and incorporated herein by reference.

Carbonaceous active materials are preferably prepared from carbon and fluorine, which includes graphitic and nongraphitic forms of carbon, such as coke, charcoal or activated carbon. Fluorinated carbon is represented by the formula $(CF_x)_n$ wherein x varies between about 0.1 to 1.9 and preferably between about 0.5 and 1.2, and $(C_2F)_n$ wherein n refers to the number of monomer units which can vary widely.

In addition to the previously described fluorinated carbon, silver vanadium oxide and copper silver vanadium oxide, $Ag_2O$, $Ag_2O_2$, $CuF_2$, $Ag_2CrO_4$, $MnO_2$, $V_2O_5$, $MnO_2$, $TiS_2$, $Cu_2S$, FeS, $FeS_2$, copper oxide, copper vanadium oxide, and mixtures thereof are contemplated as useful active materials.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$. A preferred secondary couple is of a carbonaceous anode material and a lithium cobalt oxide cathode active material.

To charge such secondary cells, the lithium ion comprising the positive electrode is intercalated into the carbonaceous negative electrode by applying an externally generated electrical potential to the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging between 0.1 and 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside of the cell. Lithiated carbon tends to react when contacted by air or water.

The above described cathode active materials, whether of a primary or a secondary chemistry, are incorporation into an electrochemical cell by mixing one or more of them with a binder material. Suitable binders are powdered fluoropolymers; more preferably powdered polytetrafluoroethylene or powdered polyvinylidene fluoride present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture thus includes a powdered fluoro-polymer binder present at about 1 to 5 weight percent, a conductive diluent present at about 1 to 5 weight percent and about 90 to 98 weight percent of the cathode active material. Cathode components are prepared by contacting the cathode active mixture in the form of slurry onto a cathode current collector selected from one of stainless steel, titanium, tantalum, platinum, gold, aluminum, cobalt nickel alloys, highly alloyed ferritic stainless steel containing molybdenum and chromium, and nickel-, chromium-, and molybdenum-containing alloys. The preferred cathode current collector material is titanium, and most preferably the titanium has a thin layer of iridium or platinum applied thereto.

In order to prevent internal short circuit conditions, the cathode is separated from the Group IA, IIA or IIIB anode by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow there through of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.).

The electrochemical cell of the present invention further includes a nonaqueous, ionically conductive electrolyte that serves as a medium for migration of ions between the anode and the cathode electrodes during the electrochemical reactions of the cell. The electrochemical reaction at the electrodes involves conversion of ions in atomic or molecular forms that migrate from the anode to the cathode. Thus, nonaqueous electrolytes suitable for the present invention are substantially inert to the anode and cathode materials, and they exhibit those physical properties necessary for ionic transport, namely, low viscosity, low surface tension and wettability.

A suitable electrolyte includes an ionizable alkali metal salt dissolved in a mixture of aprotic organic solvents. The salt serves as the vehicle for migration of the anode ions to intercalate or react with the cathode active materials. Preferably, the salt is selected from $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

Solvent systems for the electrolyte includes one cyclic carbonate selected from propylene carbonate (PC), ethylene carbonate (EC) and butylene carbonate (BC) and one linear di-ether selected from 1,2-dimethoxyethane (DME), 1,2-diethoxyethane (DEE), and 1-ethoxy,2-methoxyethane (EME). A frequently used electrolyte to activate primary lithium cells, such as Li/SVO cells, is PC and DME. However, the present invention provides an electrolyte with increased stability to both primary and secondary electrode materials as well as promoting higher delivered capacity partially replaces the cyclic carbonate and the linear di-ether with a linear carbonate and a linear mono-ether having a ratio of carbon atoms to the functional oxygen atom greater than 4:1. Suitable linear carbonates are selected from dimethyl carbonate (DME), diethyl carbonate (DEC), ethyl methyl carbonate (EMC), methyl propyl carbonate (MPC), ethyl propyl carbonate (EPC), and dipropyl carbonate (DPC). Linear mono-ethers include diethyl ether, ethyl propyl ether, ethyl isopropyl ether, ethyl butyl ether, ethyl tert-butyl ether, dipropyl ether, diisopropyl ether, dibutyl ether, diisobutyl ether, disec-butyl ether, methyl propyl ether, methyl iso-propyl ether, methyl butyl ether, methyl sec-butyl ether, methyl tert-butyl ether, and mixtures thereof. The most preferred linear ether is diisopropyl ether (DIPE).

The present invention is, therefore, generally directed to at least partially replacing PC and/or DME with a cyclic carbonate, preferably dimethyl carbonate, and linear ether, the most preferred being diisopropyl ether, in electrolytes useful for activating alkali metal-containing cells to thereby improve the electrolyte's conductivity and concomitantly the cell's discharge performance. Thus, by volume, propylene carbonate is preferably present in the electrolyte at about 20% to about 40% percent, 1,2-dimethoxyethane is present at about 20% to about 70%, diisopropyl ether is present at about 5% to about 20% and dimethyl carbonate is present at about 0% to 45%. At less than about 5 volume percent, the beneficial effects of DIPE are not pronounced enough. Above about 20 volume percent, diisopropyl ether reaches its limit of miscibility, and homogeneity is important in any solvent system.

The corrosion resistant glass used in the glass-to-metal seals has up to about 50% by weight silicon such as CABAL 12, TA 23, FUSITE 425 or FUSITE 435. The positive terminal leads preferably comprise titanium although molybdenum, aluminum, nickel alloy, or stainless steel can also be used. The cell lids are typically of a material similar to that of the casing.

Benefits attributed to the present electrochemical systems are illustrated by the following examples:

EXAMPLE I

PC:DME System, Short Term Test Using a SVO Electrode

Lithium anode material was pressed on a nickel current collector screen and silver vanadium oxide (SVO) cathode material was pressed on a titanium current collector screen. A prismatic cell stack assembly configuration having two layers of microporous membrane polypropylene separator sandwiched between the anode and cathode was prepared. The electrode assembly was then hermetically sealed in a stainless steel casing in a case negative configuration and activated with an electrolyte. Some of the cells in this example were activated with electrolyte 1 (as reference cells) and others were activated with electrolytes 2 and 3.

A constant resistive load of 7.5 kΩ was applied to the cells during an initial pre-discharge period. The pre-discharge period is referred to as burn-in and depleted the cells of approximately 1% of their theoretical capacity. After burn-in and an acceptance pulse train discharge, applying a pulse train every thirty minutes discharged these cells. The pulse trains consisted of four 10-second pulses (23.2 mA/cm$^2$) with a 15 second rest after each pulse. The delivered capacities to several voltage limits are listed in Table 1.

TABLE 1

Cell Discharge Capacity

| Electrolyte | LiAsF$_6$ Conc. | PC:DME | Capacity (mAh) at Voltage Cutoff* | | |
|---|---|---|---|---|---|
| | | | 2.0 V | 1.7 V | 1.5 V |
| 1 | 1.0M | 50:50 | 1475 | 1715 | 1784 |
| 2 | 1.0M | 40:60 | 1536 | 1726 | 1791 |
| 3 | 1.0M | 30:70 | 1575 | 1745 | 1798 |

*Average of three cells.

For short-term discharge, the delivered capacities at the three voltage cutoffs are proportional to the electrolyte conductivity. Curve 10 in FIG. 1 summarizes the relative conductivity of the binary solvent (PC:DME) electrolyte system.

EXAMPLE II

PC:DMC System, Short Term Test Using a SVO Electrode

Hermetically sealed Li/SVO cells were constructed as described in Example 1 and activated with electrolytes 1 and 4, respectively. After burn-in and an acceptance pulse train discharge, applying a pulse train at 37° C. every thirty minutes discharged these cells. The pulse trains consisted of four 10-second pulses (23.2 mA/cm$^2$) with a 15-second rest after each pulse. The delivered capacities expressed as milliampere hours at several voltage limits are listed in Table 2.

TABLE 2

Cell Discharge Capacities

| Electrolyte | LiAsF$_6$ Conc. | PC:DME:DMC | Capacity* (mAh) at Voltage Cutoff | | |
|---|---|---|---|---|---|
| | | | 2.0 V | 1.7 V | 1.5 V |
| 1 | 1.0M | 50:50:00 | 1508 | 1679 | 1735 |
| 4 | 1.2M | 30:00:70 | 1411 | 1668 | 1735 |

*Average of five cells.

Figure 2:
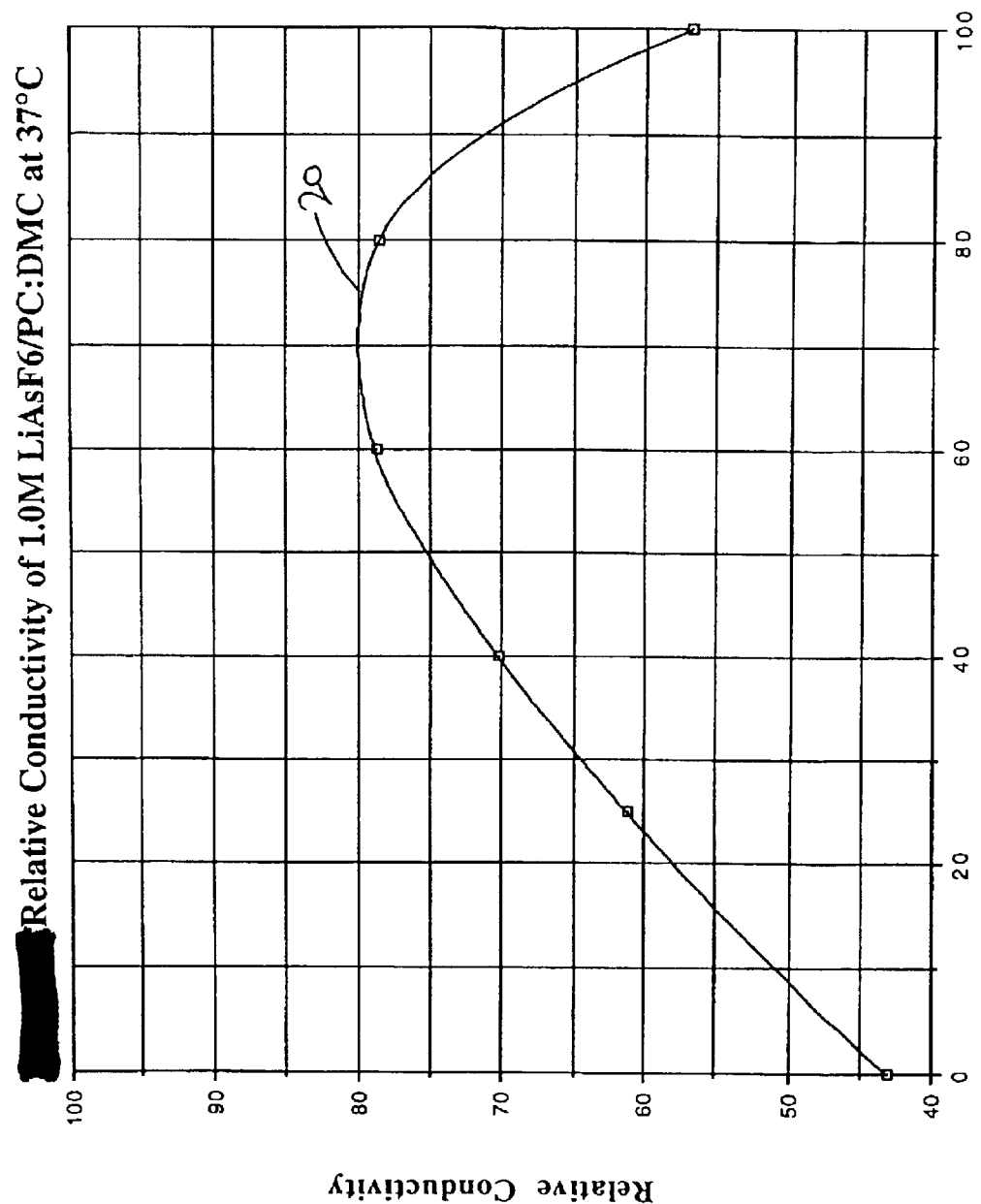
FIG. 2 is a graph of the relative conductivity of 1.0 M LiAsF$_6$ in a binary mixture of PC:DMC at various percentages of DME at 37° C.

Li/SVO cells containing electrolyte 4 delivered less capacity than the cells activated with electrolyte 1. The relative conductivity of the binary solvent (PC:DMC) electrolyte system is shown by curve 20 in FIG. 2. The results of Examples 1 and 2 demonstrate that the delivered capacity of a Li/SVO cell at each cutoff voltage is proportional to the electrolyte conductivity. Thus, a highly conductive electrolyte is desirable for the short term, high power requirements of Li/SVO cells.

EXAMPLE III

PC:DME System, Long Term Test Using a SVO Electrode

Hermetically sealed Li/SVO cells were constructed as described in Example 1 and activated with electrolytes 1 to 3, respectively. After burn-in and an acceptance pulse train discharge, applying a pulse train at 37° C. every 39 days using a 9.53 K-ohm load discharged these cells. The pulse trains consisted of four 10-second pulses (23.2 mA/cm$^2$) with 15-second rest between each pulse. The results are summarized in Table 3 (PT stands for pulse train).

TABLE 3

Long Term Test Pulse Train Data (V)*

| Electrolyte | P(pre1) | V-Delay | P(1 min) | P(4 min) |
|---|---|---|---|---|
| PT-1 | | | | |
| 1 | 3.215 | 0.000 | 2.621 | 2.491 |
| 2 | 3.215 | 0.000 | 2.669 | 2.550 |
| 3 | 3.218 | 0.000 | 2.687 | 2.587 |
| PT-2 | | | | |
| 1 | 3.131 | 0.000 | 2.570 | 2.442 |
| 2 | 3.215 | 0.000 | 2.611 | 2.491 |
| 3 | 3.218 | 0.000 | 2.616 | 2.515 |
| PT-3 | | | | |
| 1 | 2.865 | 0.000 | 2.400 | 2.311 |
| 2 | 2.855 | 0.000 | 2.433 | 2.354 |
| 3 | 2.863 | 0.000 | 2.448 | 2.379 |
| PT-4 | | | | |
| 1 | 2.598 | 0.108 | 2.114 | 2.219 |
| 2 | 2.589 | 0.130 | 2.118 | 2.258 |
| 3 | 2.595 | 0.195 | 2.087 | 2.288 |
| PT-5 | | | | |
| 1 | 2.546 | 0.077 | 1.935 | 2.050 |
| 2 | 3.545 | 0.129 | 1.858 | 2.051 |
| 3 | 3.546 | 0.150 | 1.822 | 2.058 |
| PT-6 | | | | |
| 1 | 2.526 | 0.102 | 1.810 | 1.920 |
| 2 | 2.524 | 0.109 | 1.825 | 1.957 |
| 3 | 2.527 | 0.112 | 1.825 | 1.974 |
| PT-7 | | | | |
| 1 | 2.413 | 0.000 | 1.703 | 1.568 |
| 2 | 2.383 | 0.000 | 1.693 | 1.562 |
| 3 | 2.409 | 0.000 | 1.681 | 1.550 |
| PT-8 | | | | |
| 1 | 2.178 | 0.000 | 0.995 | 0.337 |
| 2 | 2.162 | 0.000 | 0.768 | 0.329 |
| 3 | 2.172 | 0.000 | 0.967 | 0.375 |

*Average of three cells

As can be seen, the Li/SVO cells activated with electrolytes 2 and 3 exhibited higher pulse minimum potentials in pulse trains 1 to 3. The order of pulse minimum potentials in pulse trains 1 to 3 is consistent with the order of electrolyte conductivity as shown by curve 10 in FIG. 1. There was no evidence of voltage delay in the three pulse trains for all groups of Li/SVO cells. However, in pulse trains 4 to 6, the cells with electrolytes 2 and 3 exhibited larger voltage delay than those containing electrolyte 1. In pulse trains 7 and 8, no voltage delay was present for all three groups of cells. Nevertheless, the cells with electrolytes 2 and 3 exhibited lower pulse minimum potentials than those with electrolyte 1.

This example demonstrates that the beneficial effects of higher electrolyte conductivity (electrolytes 2 and 3), as seen in Example 1, are completely canceled in the long-term discharge test. Therefore, increased conductivity may not mean the electrolyte is better in actual practice.

EXAMPLE IV

PC:DMC:DME System, Short Term Test Using a SVO Electrode

Figure 3:
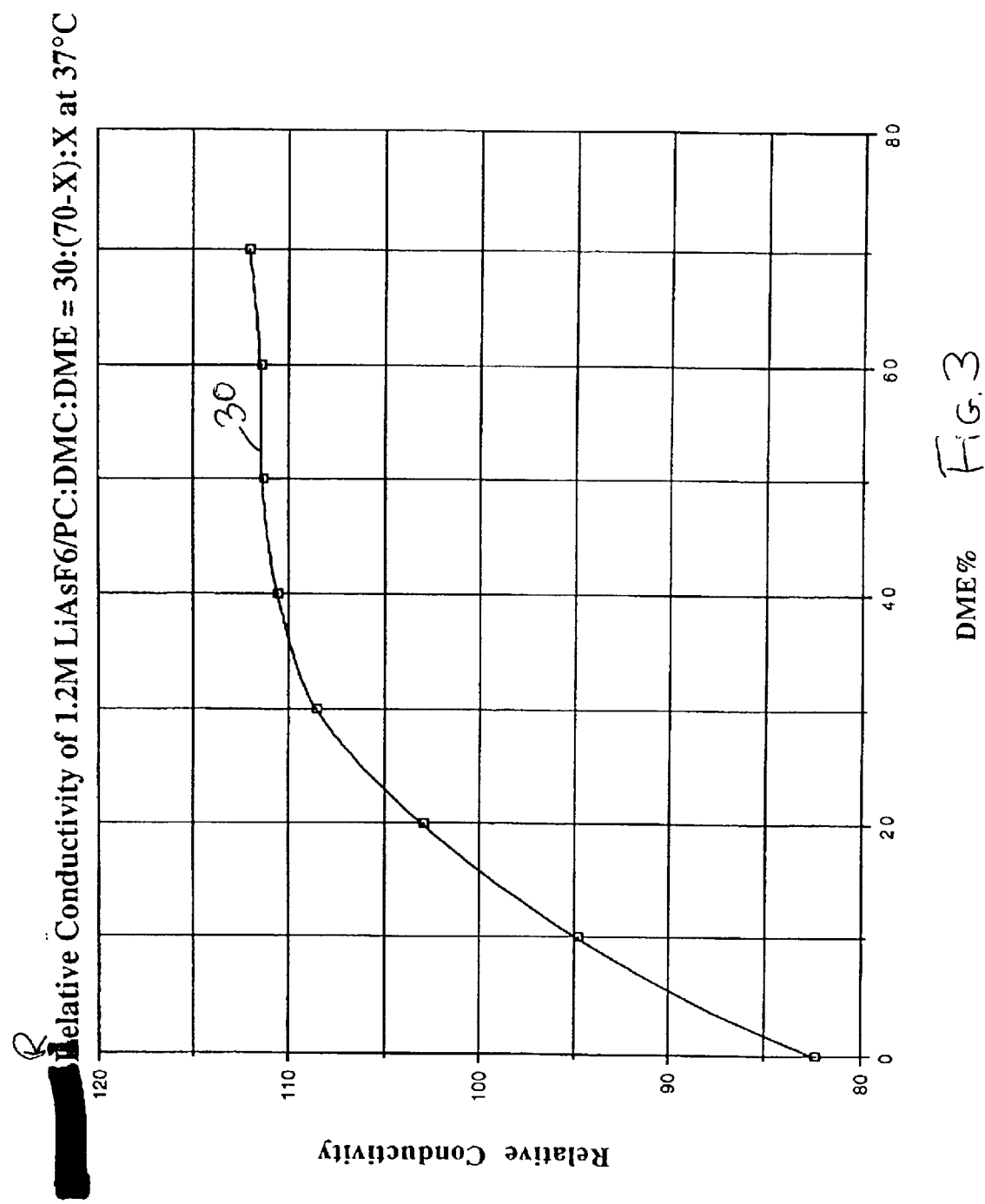
FIG. 3 is a graph of the relative conductivity of 1.2 M LiAsF$_6$ in a ternary mixture of PC:DMC:DME in the ratio of 30:(70−x):x at various percentages of DME at 37° C.
Figure 4:
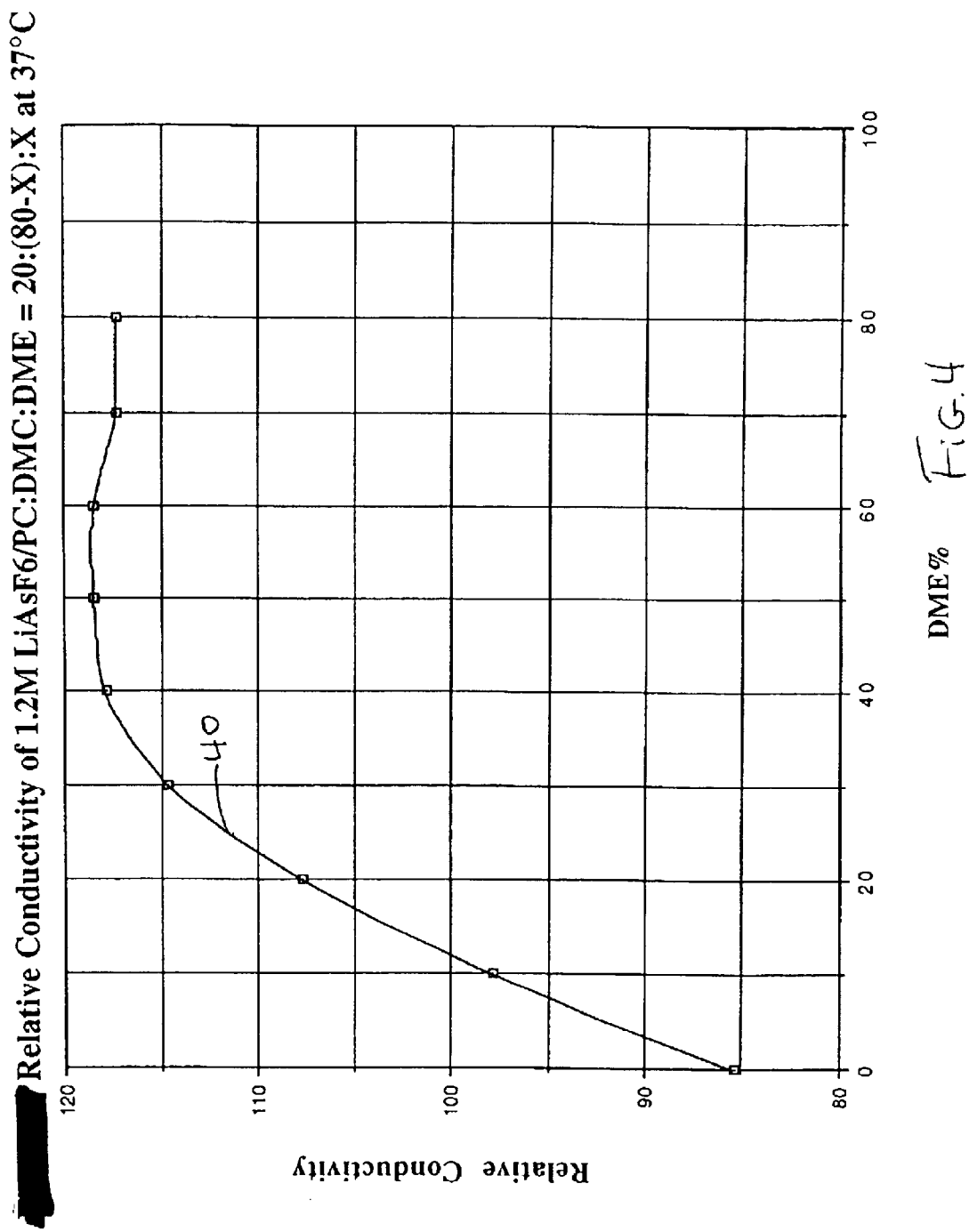
FIG. 4 is a graph of the relative conductivity of 1.2 M LiAsF$_6$ in a ternary mixture of PC:DMC:DME in the ratio of 30:(80−x):x at various percentages of DME at 37° C.

Hermetically sealed Li/SVO cells were constructed as described in Example 1 and activated with electrolytes 1, 5 to 8, respectively. The relative conductivity of electrolytes 5 to 8 are summarized in curves 30 and 40 in FIGS. 3 and 4, respectively. Curve 30 indicates 30% PC while curve 40 indicates 20% PC. A constant resistive load of 7.5 kΩ was applied to the cells during an initial pre-discharge period. After burn-in and an acceptance pulse train discharge, applying a pulse train every thirty minutes discharged these cells. The pulse trains consisted of four 10-second pulses (23.2 mA/cm$^2$) with a 15 second rest between each pulse. Electrolytes 5 to 8 are not only more conductive, but they also exhibit good stability toward the electrode materials. This results in higher delivered capacity during current pulse discharge applications. The delivered capacities to several voltage limits are listed in Table 4.

TABLE 4

Cell Discharge Capacity and Heat Dissipation

| Electrolyte | LiAsF$_6$ Conc. | PC:DME:DMC | Capacity* (mAh) at Voltage Cutoff | | |
|---|---|---|---|---|---|
| | | | 2.0 V | 1.7 V | 1.5 V |
| 1 | 1.0 M | 50:50:00 | 1505 | 1771 | 1862 |
| 5 | 1.2 M | 30:50:20 | 1540 | 1783 | 1868 |
| 6 | 1.2 M | 30:30:40 | 1565 | 1785 | 1877 |
| 7 | 1.2 M | 20:40:40 | 1585 | 1796 | 1880 |
| 8 | 1.2 M | 20:50:30 | 1565 | 1790 | 1877 |

*Average of three cells.

For those cells using the ternary solvent electrolytes 5 to 8, the improvement in cell performance is evident in terms of increased delivered capacity during high current pulse discharge.

EXAMPLE V

PC:DMC:DME System, Voltage Delay Test Using a SVO Electrode

Hermetically sealed Li/SVO cells were assembled in the same manner as described in Example 1 and activated with electrolytes 1 (reference) and 5 to 8, respectively. These cells were partially discharged using a 200-ohm resistance for 70 hours at 37° C. to remove about 43% of their theoretical capacity. After storing on open circuit at 37° C. for 8 weeks, the cells received an application of a pulse train consisting of four 23.2 mA/cm$^2$, 10 second pulses with a 15 second rest after each pulse at 37° C. The voltage delay results are listed in Table 5.

TABLE 5

Voltage Delay (V) Data From Hermetic Cells at 37° C.

| Electrolyte | Voltage Delay (V)* |
|---|---|
| 1 | 0.130 |
| 5 | 0.003 |
| 6 | 0.078 |
| 7 | 0.067 |
| 8 | 0.004 |

*Average of five cells.

For the Li/SVO cells using these ternary electrolytes, the improvement in discharge performance is clearly evident in terms of minimizing or eliminating voltage delay during high current pulses.

EXAMPLE VI

PC:DMC:DME System, Long Term Test Using a SVO Electrode

Hermetically sealed Li/SVO cells were assembled in the same way as described in Example 1 and activated with reference electrolyte 1 and electrolytes 5 to 8, respectively. After burn-in and an acceptance pulse train, these cells were discharged using a 17.4 K ohm resistor at 37° C. Pulse trains consisting of four, 23.2 MA/cm$^2$, 10-second pulses with a 15 second rest after each pulse, were applied every two months. The results are shown in Table 6.

TABLE 6

Long Term Test Pulse Train Data (V)*

| Electrolyte | P(pre1) | Voltage Delay | Pulse (1 min) | Pulse (4 min) |
|---|---|---|---|---|
| PT-1 | | | | |
| 1 | 3.230 | 0.001 | 2.644 | 2.519 |
| 5 | 3.225 | 0.001 | 2.636 | 2.528 |
| 6 | 3.228 | 0.001 | 2.643 | 2.546 |
| 7 | 3.230 | 0.001 | 2.656 | 2.566 |
| 8 | 3.228 | 0.001 | 2.651 | 2.554 |
| PT-2 | | | | |
| 1 | 3.180 | 0.000 | 2.576 | 2.451 |
| 5 | 3.177 | 0.000 | 2.556 | 2.448 |
| 6 | 3.174 | 0.047 | 2.532 | 2.558 |
| 7 | 3.178 | 0.076 | 2.509 | 2.477 |
| 8 | 3.177 | 0.057 | 2.525 | 2.473 |
| PT-3 | | | | |
| 1 | 2.971 | 0.000 | 2.455 | 2.358 |
| 5 | 2.970 | 0.000 | 2.443 | 2.358 |
| 6 | 2.972 | 0.001 | 2.448 | 2.364 |
| 7 | 2.975 | 0.006 | 2.455 | 2.385 |
| 8 | 2.958 | 0.001 | 2.452 | 2.375 |
| PT-4 | | | | |
| 1 | 2.732 | 0.009 | 2.246 | 2.222 |
| 5 | 2.740 | 0.000 | 2.274 | 2.247 |
| 6 | 2.738 | 0.010 | 2.274 | 2.251 |
| 7 | 2.741 | 0.064 | 2.237 | 2.270 |
| 8 | 2.727 | 0.069 | 2.215 | 2.260 |
| PT-5 | | | | |
| 1 | 2.574 | 0.049 | 2.080 | 2.131 |
| 5 | 2.577 | 0.227 | 1.932 | 2.159 |
| 6 | 3.576 | 0.038 | 2.115 | 2.166 |
| 7 | 2.577 | 0.005 | 2.152 | 2.186 |
| 8 | 2.572 | 0.087 | 2.071 | 2.180 |
| PT-6 | | | | |
| 1 | 2.534 | 0.215 | 1.698 | 1.937 |
| 5 | 2.536 | 0.020 | 2.034 | 2.069 |
| 6 | 2.534 | 0.022 | 1.983 | 2.032 |
| 7 | 2.534 | 0.001 | 2.040 | 2.071 |
| 8 | 2.531 | 0.006 | 2.074 | 2.090 |
| PT-7 | | | | |
| 1 | 2.490 | 0.154 | 1.623 | 1.762 |
| 5 | 2.497 | 0.001 | 1.877 | 1.871 |
| 6 | 2.490 | 0.088 | 1.774 | 1.865 |
| 7 | 2.496 | 0.098 | 1.811 | 1.946 |
| 8 | 2.487 | 0.031 | 1.880 | 1.922 |
| PT-8 | | | | |
| 1 | 2.341 | 0.001 | 1.569 | 1.491 |
| 5 | 2.351 | 0.052 | 1.580 | 1.605 |
| 6 | 0.319 | 0.000 | 1.523 | 1.462 |

TABLE 6-continued

Long Term Test Pulse Train Data (V)*

| Electrolyte | P(pre1) | Voltage Delay | Pulse (1 min) | Pulse (4 min) |
|---|---|---|---|---|
| 7 | 2.340 | 0.057 | 1.514 | 1.541 |
| 8 | 2.334 | 0.072 | 1.549 | 1.611 |

*Average of five cells.

The results in Table 6 demonstrate that Li/SVO cells activated with ternary solvent electrolytes 5 to 8 maintained higher pulse 4 minimum potentials throughout the test, as compared to the cells having the binary solvent electrolyte 1. The conclusion is that acceptable discharge performance is obtainable for Li/SVO cells using the ternary solvent electrolytes 5 and 8. The cells activated with these solvents, however, exhibited larger voltage delay than those using electrolyte 1 in several pulse trains. The long-term stability is addressed in the following examples.

EXAMPLE VII

PC:DMC:DME System, Predischarge Stability Tests Using a SVO Electrode

Hermetically sealed Li/SVO cells were assembled as described in Example 1 and activated with electrolyte 1 (reference) and electrolytes 5 and 7, respectively. After burn in and acceptance pulse train, these cells were divided into 5 groups. They were pre-discharged using a 200-ohm resistor to remove 15.4%, 30.9%, 46.3%, 61.8% and 82.3% capacities (DOD), respectively. The cells were then stored on open circuit at 37° C. Heat dissipation and open circuit potentials were recorded at 1 week, 10 weeks, and 20 weeks after the start of storage. Heat dissipation was determined by microcalorimetry and is quantified in microwatts ($\mu W$), (where 1 $\mu W = 1 \times 10^{-6}$ W). The results are shown in Tables 7 to 11.

At 15.4% DOD (Table 7), all three groups of Li/SVO cells exhibit fairly small but similar heat dissipation. Their open cell voltages (OCV) were also very similar after storage. At 30.9% DOD (Table 8), all groups of Li/SVO cells also presented similar heat dissipation after 10 weeks of storage. At 20 weeks of storage, the Li/SVO cells with electrolytes 5 and 7 exhibited slightly larger heat dissipation, while at the same time their OCV dropped at slightly faster rate than the cells with electrolyte 1.

At 46.3% DOD (Table 9), Li/SVO cells with electrolytes 5 and 7 had obviously greater heat dissipation than the cells with electrolyte 1. This again was evidenced by the lower OCV of the cells with electrolytes 5 and 7 relative to those cells with electrolyte 1, although the difference is only about 20 mV. At 61.8% (Table 10) and 82.3% DOD (Table 11), significantly larger heat dissipation was observed for the Li/SVO cells with electrolytes 5 and 7 than for those with electrolyte 1. The OCV also dropped significantly for the cells with these ternary solvent electrolytes.

The data in Examples 4 to 7 demonstrate that Li/SVO cells with electrolytes containing PC:DMC:DME mixed solvent electrolytes function well under some experimental conditions. While stability problems exist under some other conditions, it is especially noticeable at 40% DOD, and higher.

TABLE 7

Heat Dissipation and Cell OCV at 15.4% DOD

| | Heat Dissipation ($\mu W$) | | | OCV (V) | | |
|---|---|---|---|---|---|---|
| Electrolyte | 1 week | 10 weeks | 20 weeks | 1 week | 10 weeks | 20 weeks |
| 1 | 27.9 | 7.3 | 2.4 | 3.228 | 3.255 | 3.257 |
| 5 | 22.2 | 2.9 | 0.1 | 3.233 | 3.256 | 3.259 |
| 7 | 25.2 | 4.1 | 3.1 | 3.233 | 3.257 | 3.260 |

TABLE 8

Heat Dissipation and Cell OCV at 30.9% DOD

| | Heat Dissipation ($\mu W$) | | | OCV (V) | | |
|---|---|---|---|---|---|---|
| Electrolyte | 1 week | 10 weeks | 20 weeks | 1 week | 10 weeks | 20 weeks |
| 1 | 24.0 | 6.6 | 2.9 | 3.024 | 3.045 | 3.037 |
| 5 | 25.2 | 5.1 | 3.4 | 3.022 | 3.019 | 3.007 |
| 7 | 25.6 | 6.3 | 3.7 | 3.009 | 3.001 | 2.992 |

TABLE 9

Heat Dissipation and Cell OCV at 46.3% DOD

| | Heat Dissipation ($\mu W$) | | | OCV (V) | | |
|---|---|---|---|---|---|---|
| Electrolyte | 1 week | 10 weeks | 20 weeks | 1 week | 10 weeks | 20 weeks |
| 1 | 6.7 | 20.1 | 13.4 | 2.599 | 2.612 | 2.613 |
| 5 | 11.0 | 31.3 | 27.4 | 2.607 | 2.608 | 2.595 |
| 7 | 28.1 | 37.9 | 32.2 | 2.606 | 2.602 | 2.591 |

TABLE 10

Heat Dissipation and Cell OCV at 61.8% DOD

| | Heat Dissipation ($\mu W$) | | | OCV (V) | | |
|---|---|---|---|---|---|---|
| Electrolyte | 1 week | 10 weeks | 20 weeks | 1 week | 10 weeks | 20 weeks |
| 1 | 21.4 | 25.2 | 12.7 | 2.558 | 2.559 | 2.557 |
| 5 | 501.4 | 223.8 | 177.1 | 2.494 | 2.374 | 2.289 |
| 7 | 134.5 | 160.4 | 173.2 | 2.531 | 2.458 | 2.384 |

TABLE 11

Heat Dissipation and Cell OCV at 82.3% DOD

| | Heat Dissipation ($\mu W$) | | | OCV (V) | | |
|---|---|---|---|---|---|---|
| Electrolyte | 1 week | 10 weeks | 20 weeks | 1 week | 10 weeks | 20 weeks |
| 1 | 21.6 | 14.0 | 5.3 | 2.217 | 2.239 | 2.260 |
| 5 | 114.3 | 75.8 | 64.0 | 2.207 | 2.187 | 2.172 |
| 7 | 71.6 | 52.7 | 44.6 | 2.197 | 2.195 | 2.187 |

EXAMPLE VIII

PC:DME:DIPE System Long Term Test Using a SVO Electrode

Hermetically sealed Li/SVO cells assembled as described in Example 1 were activated with electrolytes 1 and 9 (1.1

Figure 5:
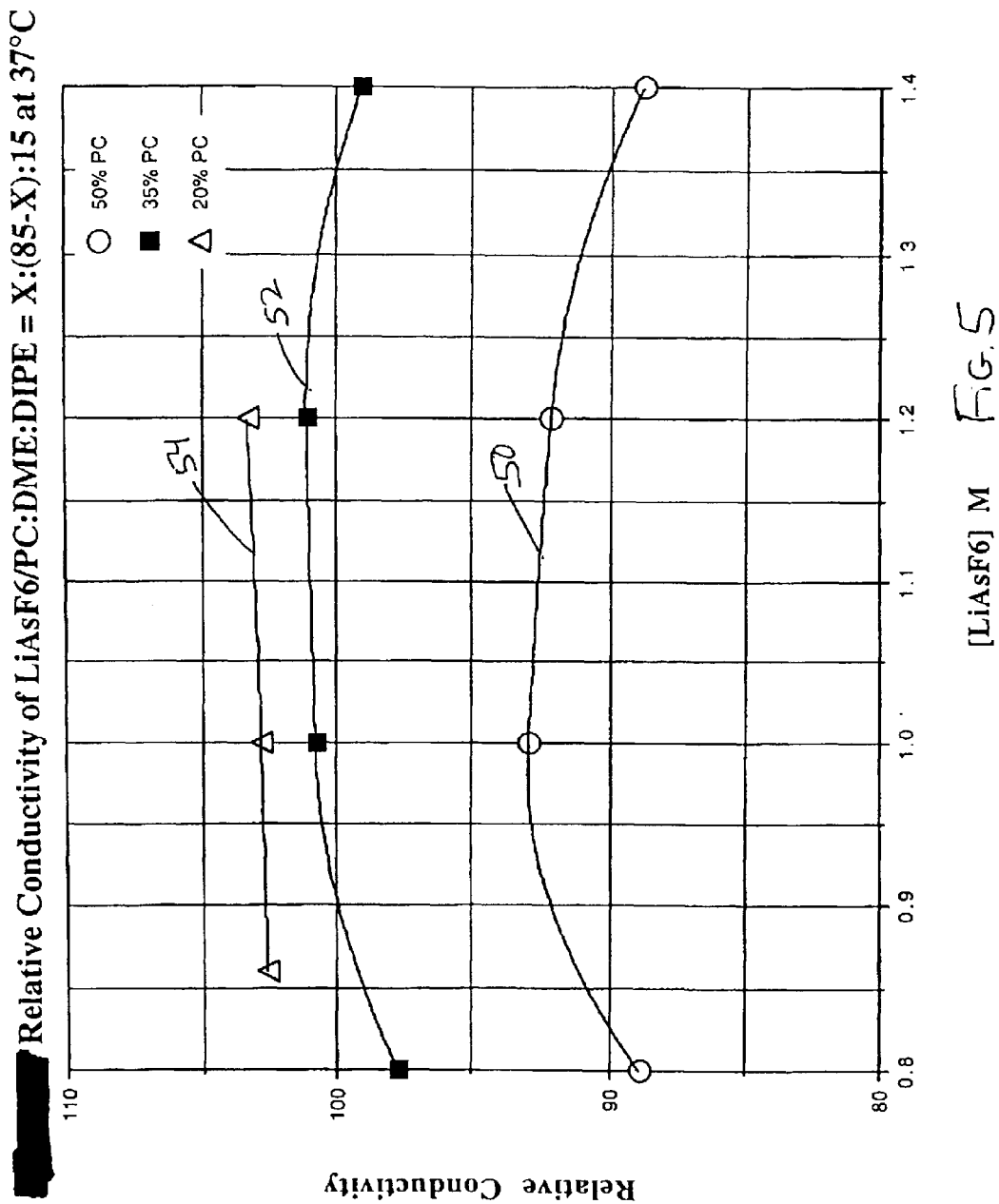
FIG. 5 is a graph of the relative conductivity of various molar concentrations of LiAsF$_6$ in a ternary mixture of PC:DME:DIPE in the ratio of x:(85−x):15 at 37° C.

M LiAsF$_6$/PC:DME:DIPE=50:35:15), respectively. After burn-in and an acceptance pulse train discharge, these cells were discharged using a 17.4 Kohm resistor at 37° C. Pulse trains consisting of four 23.2 mA/cm$^2$, 10 second pulses with 15 second rest between each pulse were applied every two months. The results are summarized in Table 12 and FIG. 5. In FIG. 5, curve 50 indicates the use of 20% PC, curve 52 indicates the use of 35% PC, and curve 54 indicates the use of 50% PC in the solvent mixture.

TABLE 12

Long Term Test Pulse Train Data*

| Electrolyte | P(pre1) (V) | V-Delay (V) | P(1 min) (V) | P(4 min) (V) |
|---|---|---|---|---|
| PT-1 | | | | |
| 1 | 3.228 | 0.000 | 2.702 | 2.611 |
| 9 | 3.224 | 0.000 | 2.671 | 2.561 |
| PT-2 | | | | |
| 1 | 3.163 | 0.001 | 2.611 | 2.498 |
| 9 | 3.162 | 0.001 | 2.590 | 2.468 |
| PT-3 | | | | |
| 1 | 2.900 | 0.000 | 2.446 | 2.364 |
| 9 | 2.895 | 0.000 | 2.432 | 2.331 |
| PT-4 | | | | |
| 1 | 2.608 | 0.196 | 2.055 | 2.248 |
| 9 | 2.602 | 0.014 | 2.196 | 2.214 |
| PT-5 | | | | |
| 1 | 2.540 | 0.345 | 1.652 | 2.049 |
| 9 | 2.538 | 0.129 | 1.896 | 2.046 |
| PT-6 | | | | |
| 1 | 2.508 | 0.239 | 1.575 | 1.870 |
| 9 | 2.501 | 0.143 | 1.776 | 1.906 |
| PT-7 | | | | |
| 1 | 2.357 | 0.000 | 1.735 | 1.661 |
| 9 | 2.339 | 0.000 | 1.746 | 1.656 |
| PT-8 | | | | |
| 1 | 2.170 | 0.000 | 1.483 | 1.087 |
| 9 | 2.165 | 0.000 | 1.505 | 1.218 |

*Average of three cells.

Lower pulse 4 minimum potentials (because of larger Rdc) were observed for the Li/SVO cells having electrolyte 9 in pulse trains 1 to 4 relative to that of cells with electrolyte 1. This is because electrolyte 9 is less conductive than electrolyte 1 (see FIG. 5). In pulse trains 4 to 6, voltage delay was present in both groups of cells. However, the control cells with electrolyte 1 exhibited larger voltage delay than the cells with electrolyte 9 in all three pulse trains. As a result, Li/SVO cells activated with electrolyte 9 presented higher pulse 1 minimum potentials in pulse trains 4 to 6 than the control cells. Starting from pulse train 5, the order of pulse 4 minimum potentials was also reversed. This data demonstrates that Li/SVO cells activated with the ternary solvent electrolyte 9 are more stable in the later half of their service life than are the control cells having the standard binary solvent mixture.

EXAMPLE IX

PC:DME:DIPE System Long Term Test Using a CSVO Electrode

In this example, the hermetically sealed lithium cells were assembled as described in Example 1 except that a CSVO cathode was used instead of SVO. The Li/CSVO cells were activated with electrolytes 10 (1.2 M LiPF6/PC:DME=50:50) and 11 (1.2 M LiPF$_6$/PC:DME:DIPE=30:55:15), respectively. After burn-in and an acceptance pulse train discharge, these cells were put on two different tests: test series (A) and test series (B).

Series (A): The Li/CSVO cells were discharged using a 9.53K-ohm resistor at 37° C. Pulse trains consisting of four 23.2 mA/cm$^2$, 10 second pulses with 15 second rest after each pulse were applied every 39 days. The test results are summarized in Table 13.

TABLE 13

Series (A) Test Pulse Train Data*

| Electrolyte | P(pre1) (V) | V-Delay (V) | P(1 min) (V) | P(4 min) (V) |
|---|---|---|---|---|
| PT-1 | | | | |
| 10 | 3.233 | 0.000 | 2.575 | 2.454 |
| 11 | 3.219 | 0.000 | 2.575 | 2.468 |
| PT-2 | | | | |
| 10 | 2.990 | 0.012 | 2.463 | 2.375 |
| 11 | 2.988 | 0.016 | 2.465 | 2.415 |
| PT-3 | | | | |
| 10 | 2.852 | 0.032 | 2.292 | 2.246 |
| 11 | 2.850 | 0.000 | 2.364 | 2.305 |
| PT-4 | | | | |
| 10 | 2.724 | 0.183 | 1.984 | 2.069 |
| 11 | 2.722 | 0.091 | 2.108 | 2.123 |
| PT-5 | | | | |
| 10 | 2.551 | 0.153 | 1.762 | 1.857 |
| 11 | 2.550 | 0.017 | 1.955 | 1.924 |
| PT-6 | | | | |
| 10 | 2.485 | 0.000 | 1.793 | 1.611 |
| 11 | 2.484 | 0.001 | 1.865 | 1.732 |
| PT-7 | | | | |
| 10 | 2.227 | 0.000 | 1.390 | 1.116 |
| 11 | 2.225 | 0.000 | 1.386 | 1.141 |

*Average of three cells.

The data in Table 13 indicate that even though both groups of Li/CSVO cells exhibited acceptable pulse performance, those with ternary solvent electrolyte 11 preformed better overall in terms of less voltage delay and equal or higher pulse minimum potentials than those with binary solvent electrolyte 10.

Series (B): The Li/CSVO cells were discharged using a 60.4 K-ohm resistor at 37° C. Pulse trains consisting of four 23.2 mA/cm$^2$, 10 second pulses with 15 second rest after each pulse were applied every 4 months. The test results are summarized in Table 14.

TABLE 14

Series (B) Test Pulse Train Data*

| Electrolyte | P(pre1) (V) | V-Delay (V) | P(1 min) (V) | P(4 min) (V) |
|---|---|---|---|---|
| PT-1 | | | | |
| 10 | 3.231 | 0.001 | 2.593 | 2.475 |
| 11 | 3.282 | 0.000 | 2.587 | 2.482 |

TABLE 14-continued

Series (B) Test Pulse Train Data*

| Electrolyte | P(pre1) (V) | V-Delay (V) | P(1 min) (V) | P(4 min) (V) |
|---|---|---|---|---|
| PT-2 | | | | |
| 10 | 3.044 | 0.030 | 2.489 | 2.426 |
| 11 | 3.044 | 0.012 | 2.506 | 2.437 |
| PT-3 | | | | |
| 10 | 2.944 | 0.076 | 2.317 | 2.301 |
| 11 | 2.956 | 0.019 | 2.385 | 2.335 |
| PT-4 | | | | |
| 10 | 2.875 | 0.368 | 1.963 | 2.243 |
| 11 | 2.881 | 0.098 | 2.258 | 2.289 |
| PT-5 | | | | |
| 10 | 2.823 | 0.324 | 1.815 | 1.968 |
| 11 | 2.826 | 0.134 | 2.145 | 2.193 |
| PT-6 | | | | |
| 10 | 2.770 | 0.158 | 1.847 | 1.877 |
| 11 | 2.776 | 0.055 | 2.172 | 2.127 |
| PT-7 | | | | |
| 10 | 2.605 | 0.000 | 1.065 | 1.058 |
| 11 | 2.612 | 0.038 | 1.978 | 1.974 |
| PT-8 | | | | |
| 10 | 2.572 | 0.000 | 0.813 | 0.659 |
| 11 | 2.574 | 0.000 | 1.854 | 1.790 |
| PT-9 | | | | |
| 10 | — | — | — | — |
| 11 | 2.547 | 0.000 | 1.846 | 1.732 |
| PT-10 | | | | |
| 10 | — | — | — | — |
| 11 | 2.499 | 0.000 | 1.748 | 1.589 |

*Average of four cells.

The results shown in Table 14 provide subsequent proof to the conclusion of series test (A) that ternary solvent electrolyte 11, containing DIPE, stabilizes the Li/CSVO cell system in a long-term pulse discharge test. Higher pulse minimum potentials and longer service life were obtained for the cells activated with electrolyte 11 relative to those with electrolyte 10.

In the above examples, the data demonstrate that the ability of Li/SVO and Li/CSVO cells to deliver capacity in quick pulse discharge conditions is proportional to the electrolyte conductivity. However, the electrolyte composition has a significant impact on the long-term stability of the SVO and CSVO cell systems, which are independent of electrolyte conductivity. As a result, the ternary solvent system of PC:DME:DMC is considered to be a better electrolyte system in terms of conductivity, but under some experimental conditions, it is a less desirable electrolyte system in terms of stability as compared to the PC:DME binary solvent system.

In contrast, the ternary solvent electrolyte of PC:DME:DIPE is a better solvent system than the PC:DME binary solvent electrolyte system in terms of long term stability for Li/SVO and Li/CSVO cells. However, in this later case, both electrolyte systems present similar conductivity. Thus, to combine the advantages of the high conductivity of the PC:DME:DMC system and the long term stability of the PC:DME:DIPE system, a quaternary solvent electrolyte system was developed as shown in the following examples.

EXAMPLE X

Quaternary Solvent Electrolyte System Using 30 Percent PC

In this example, three electrolyte systems were prepared by dissolving 1.0 M $LiAsF_6$ salt in various mixtures of PC:DIPE:DME:DMC, wherein the PC content was fixed at about 30%. The relative conductivities of the electrolytes summarized in FIG. 6 are based on 1.0 M $LiAsF_6$/PC:DME= 50:50 at 37° C. as the standard having a conductivity of 100%.

In the first electrolyte system, 5% DIPE (curve 60) was used. The ratio of DME and DMC was then adjusted with the percentage of DMC ranging from about 10% to about 50%. In the second electrolyte system, 10% DIPE was used (curve 62). The ratio of DME and DMC was then adjusted with the percentage of DMC ranging from about 10% to about 50%. Finally, in the third electrolyte system, 15% DIPE (curve 64) was used. The ratio of DME and DMC was then adjusted with the percentage of DMC ranging from about 10% to about 50%.

Figure 6:
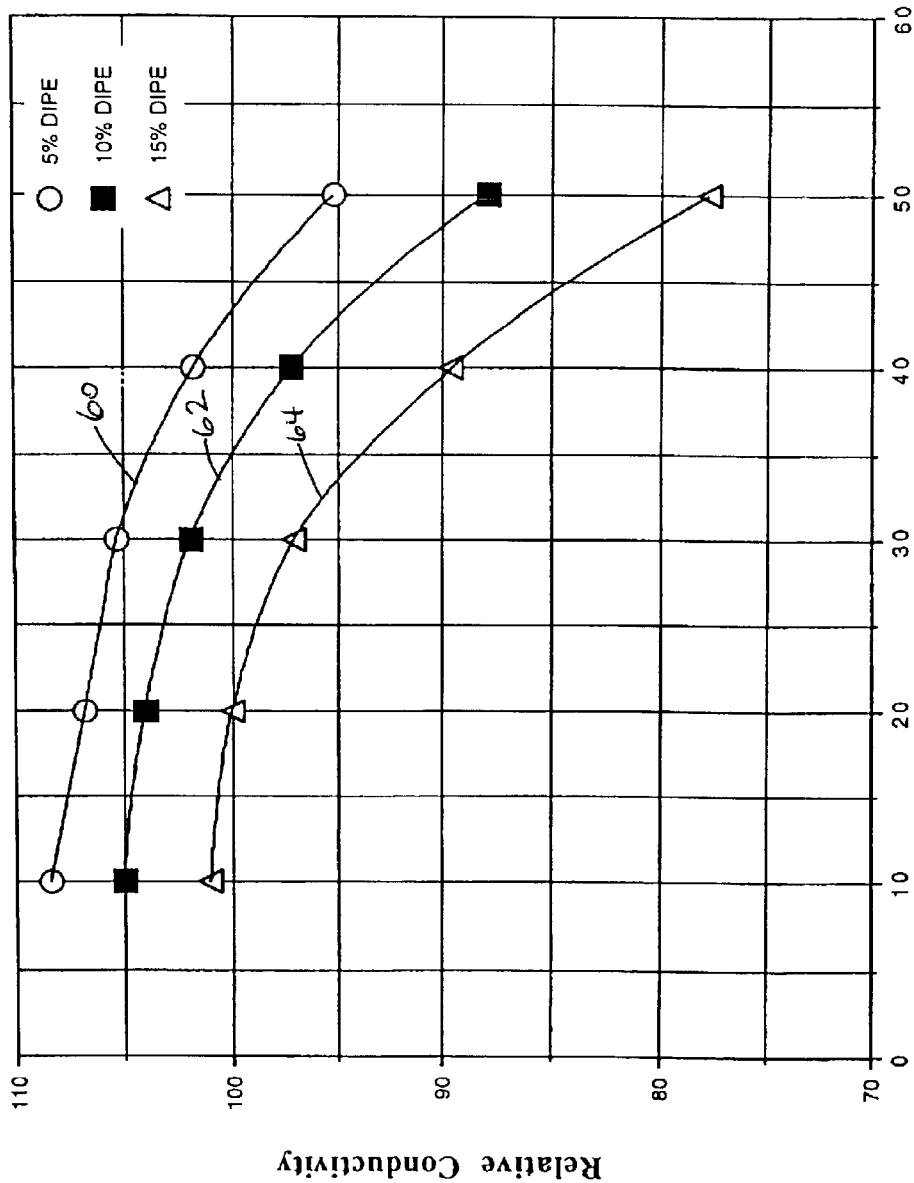
FIG. 6 is a graph of the relative conductivity of 1.0 M LiAsF$_6$ in a mixture of PC:DIPE:DME:DMC at ratios of 30:5(10 or 15):[65(60 or 55)−x]:x relative to various molar percentages of DMC at 37° C.

The results shown in FIG. 6 demonstrate the following:

First, in the case where 5% DIPE was used, electrolytes with percentages of DMC ranging from about 45% or less, resulted in equal or higher discharge capacity than that of the standard reference electrolyte 1. The total volume percent of DMC and DIPE varied from about 5% to about 50% while the DME content varied from about 20% to about 65%.

Secondly, in the case where 10% DIPE was used, electrolytes with percentages of DMC ranging from about 35% or less resulted in equal or higher capacities than that of the standard reference electrolyte 1. The total volume percent of DMC and DIPE varied from about 10% to about 45% while the DME content varied from about 25% to about 60%.

Finally, in the case where 15% DIPE was used, electrolytes with percentages of DMC ranging from about 20% or less resulted in equal or higher capacity than that of the standard reference electrolyte 1. The total volume percent of DMC and DIPE varied from about 15% to about 35% while the DME content varied from about 35% to about 55%.

EXAMPLE XI

Quaternary Solvent Electrolyte System Using 10 Percent Fixed DIPE

In this example, three 1.0 M $LiAsF_6$ electrolyte systems were prepared by dissolving the salt in various mixtures of PC:DIPE:DME:DMC with the DIPE content fixed at 10%. The relative conductivities of the electrolytes summarized in FIG. 7 are based on 1.0 M $LiAsF_6$/PC:DME=50:50 at 37° C. as the standard having a conductivity of 100%.

In the first electrolyte system, 20% PC (curve 70) was used. The ratio of DME and DMC was then adjusted with the percentage of DMC ranging from about 10% to about 50%. However, in the second electrolyte system, 30% PC (curve 72) was used. The ratio of DME and DMC was then adjusted with the percentage of DMC ranging from about 10% to about 50%. Finally, in the third electrolyte system, 40% PC (curve 74) was used. The ratio of DME and DMC was then adjusted with the percentage of DMC ranging from about 10% to about 40%.

Figure 7:
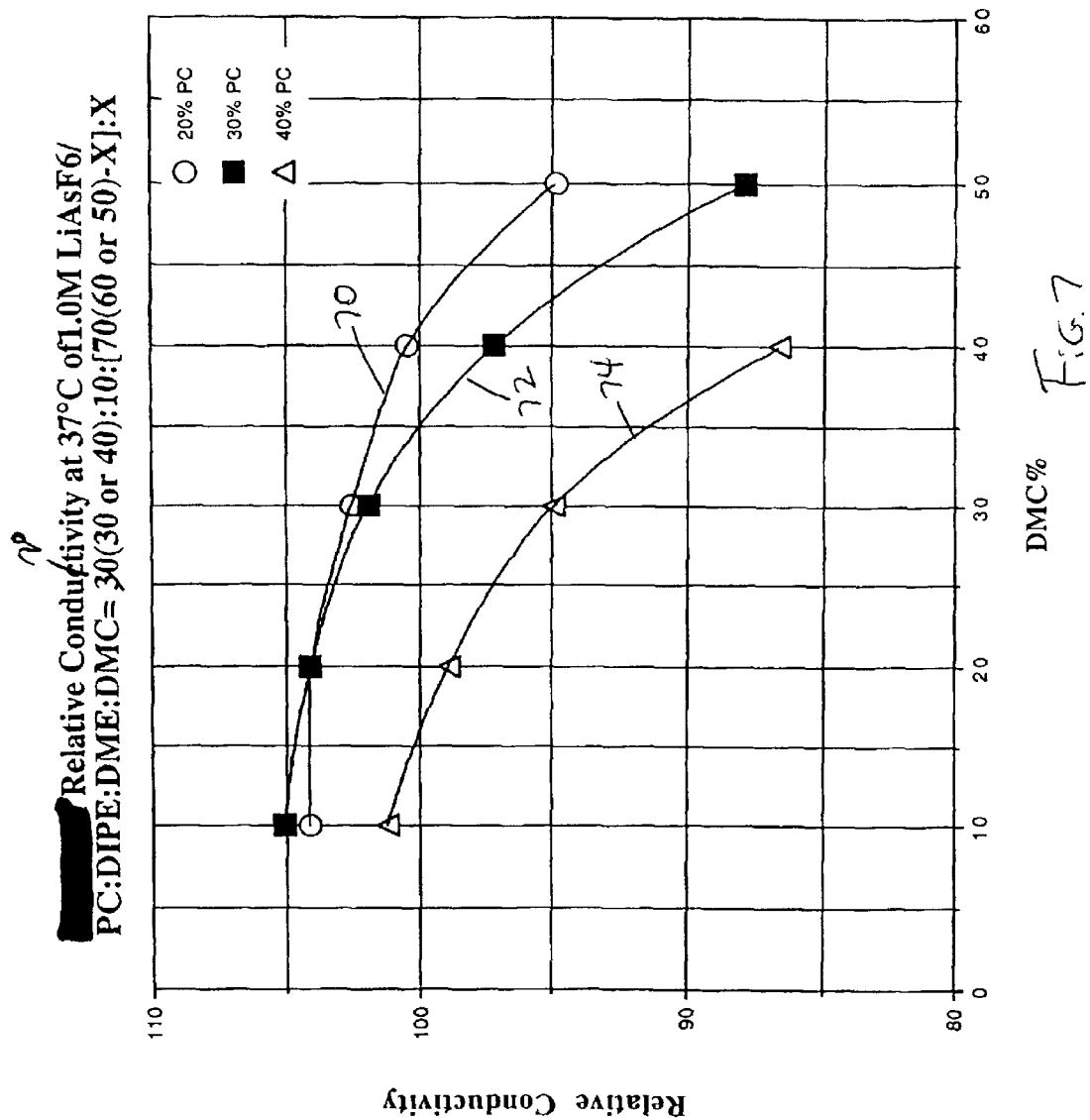
FIG. 7 is a graph of the relative conductivity of 1.0 M LiAsF$_6$ in a mixture of PC:DIPE:DME:DMC at ratios of 20(30 or 40):10:[70(60 or 50)−x]:x relative to various molar percentages of DMC at 37° C.

The results shown in FIG. 7 demonstrate the following:

First, in the case when 20% PC was used, electrolytes having a percentage of DMC ranging from about 40% or less resulted in equal or higher capacity than that of the reference standard electrolyte 1. The total volume percent of DMC and DIPE varied from about 10% to about 50% while the DME content varied from about 30% to about 70%.

Secondly, in the case when 30% PC was used, electrolytes having a percentage of DMC ranging from about 35% or less resulted in equal or higher capacity than that of the reference standard electrolyte. The total volume percent of DMC and DIPE varied from about 10% to about 45% while the DME content varied from about 25% to about 60%.

Finally, in the case where 40% PC was used, electrolytes having a percentage of DMC ranging from about 15% or less resulted in equal or higher capacity than that of the reference standard electrolyte. The total volume percent of DMC and DIPE varied from about 10% to about 25% while the DME content varied from about 35% to about 50%.

EXAMPLE XII

Quaternary Solvent Electrolyte System at Various Concentrations of $LiAsF_6$ In this example, three electrolyte systems were prepared by dissolving $LiAsF_6$ in various mixtures of PC:DIPE:DME:DMC. The concentration of the $LiAsF_6$ salt was varied from about 0.8 M to about 1.4M. The relative conductivities of the electrolytes summarized in FIG. 8 are based on 1.0 M $LiAsF_6$/PC:DME=50:50 at 37° C. as the standard having a conductivity of 100%.

In the first electrolyte system, the solvent system of PC:DIPE:DME:DMC=30:5:55:10 (curve 80) was used. The $LiAsF_6$ salt concentration was in the range of about 0.8 M to about 1.4 M. However, in the second electrolyte, the solvent system of PC:DIPE:DME:DMC=30:10:50:10 (curve 82) was used. The $LiAsF_6$ salt concentration was in the range of about 0.8 M to about 1.4 M. Finally, in the third electrolyte, the solvent system of PC:DIPE:DME:DMC=30:10:40:20 (curve 84) was used. The $LiAsF_6$ concentration was in the range of about 0.8 M to about 1.4 M.

Figure 8:
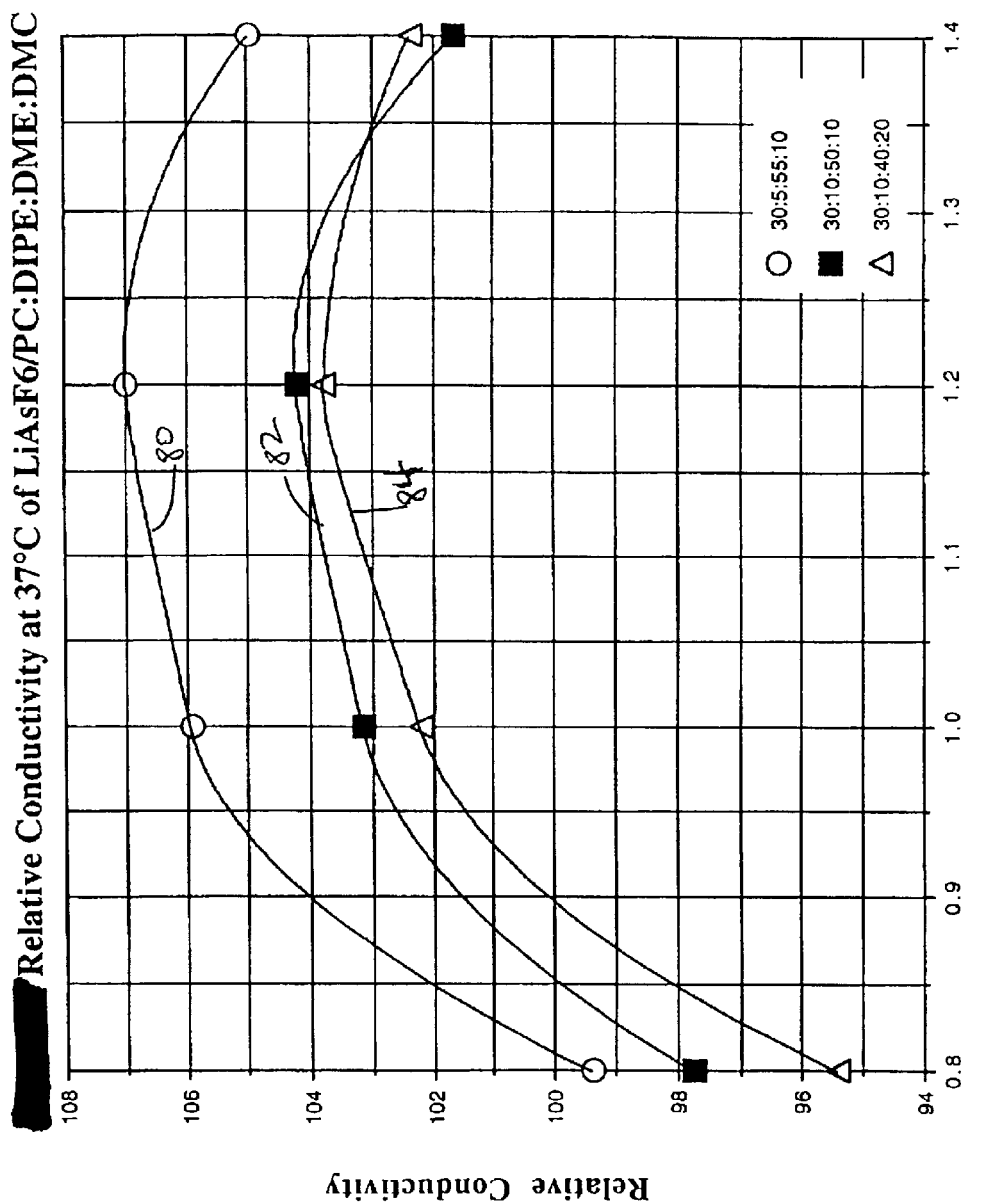
FIG. 8 is a graph of the relative conductivity of various concentrations of LiAsF$_6$ in a mixture of PC:DIPE:DME:DMC at various solvent ratios at 37° C.

The results shown in FIG. 8 demonstrate the following:

First, in the case where the solvent system of PC:DIPE:DME:DMC=30:5:55:10 was used, electrolytes having a $LiAsF_6$ concentration ranging from about 0.80 M to about 1.55 M resulted in equal or higher capacities than that of the standard reference electrolyte, with the highest conductivity observed at about 1.20 M $LiAsF_6$.

Secondly, in the case where the solvent system of PC:DIPE:DME:DMC=30:10:50:10 was used, electrolytes having the $LiAsF_6$ concentration ranging from about 0.85 M to about 1.50 M resulted in equal or higher capacities than that of the standard reference electrolyte, with the highest conductivity observed at about 1.2 M $LiAsF_6$.

Finally, in the case where the solvent system of PC:DIPE:DME:DMC=30:10:40:20 was used, electrolytes with the $LiAsF_6$ concentration ranging from about 0.90 M to about 1.50 M resulted in equal or higher capacities than that of the standard reference electrolyte, with the highest conductivity also observed at about 1.2 M $LiAsF_6$.

The results from Examples 10 to 12 clearly demonstrate that the quaternary solvent electrolytes containing PC, DME, DIPE and DMC yield a higher conductivity at 37° C. than that of the conventional reference electrolyte. The preferred relative content of each component was as follows:

| | |
|---|---|
| $LiAsF_6$: | about 0.8M to about 1.6M |
| PC: | about 20% to about 40% |
| DME: | about 20% to about 70% |
| DIPE: | about 5% to about 20% |
| DMC: | about 0% to about 45% |

Therefore, the presence of solvents with low donation numbers (DMC and DIPE) minimizes or possibly eliminates the voltage delay problem in Li/SVO and Li/CSVO cells. The presence of DIPE in the quaternary solvent electrolytes enhances the long-term stability of these cells.

EXAMPLE XIII

PC:DME:DIPE:DMC System Long Term Test with SVO Electrode

In this example, the hermetically sealed Li/SVO cells were assembled as described in Example 1. The cells were activated with various solvents including the reference electrolyte 1 (1.0 M $LiAsF_6$/PC:DME=1:1), experimental solvents 3a (1.1 M $LiAsF_6$/PC:DME=30:70) and 12 (1.1 M $LiAsF_6$/PC:DME:DIPE:DMC=30:50:10:10) respectively. After burn-in and an acceptance pulse train, these cells were divided into test series (A) and test series (B) as summarized below:

Series (A): The cells were discharged using a 17.4 Kohm resistor at 37° C. Pulse trains consisting of four 23.2 mA/cm$^2$, 10 second pulses with a 15 second rest after each pulse were applied every 35 days. The test results are summarized in Table 15.

TABLE 15

| | Series (A) Pulse Train Data* | | | |
|---|---|---|---|---|
| Electrolyte | P(pre1) (V) | V-Delay (V) | P(1 min) (V) | P(4 min) (V) |
| PT-1 | | | | |
| 1 | 3.215 | 0.017 | 2.538 | 2.457 |
| 3a | 3.217 | 0.067 | 2.527 | 2.516 |
| 12 | 3.216 | 0.037 | 2.550 | 2.511 |
| PT-2 | | | | |
| 1 | 3.174 | 0.088 | 2.451 | 2.429 |
| 3a | 3.172 | 0.146 | 2.437 | 2.491 |
| 12 | 3.171 | 0.090 | 2.487 | 2.481 |
| PT-3 | | | | |
| 1 | 2.976 | 0.068 | 2.343 | 2.323 |
| 3a | 2.963 | 0.131 | 2.319 | 2.371 |
| 12 | 2.963 | 0.056 | 2.393 | 2.369 |
| PT-4 | | | | |
| 1 | 2.732 | 0.413 | 1.818 | 2.219 |
| 3a | 2.715 | 0.365 | 1.873 | 2.249 |
| 12 | 2.722 | 0.410 | 1.858 | 2.252 |
| PT-5 | | | | |
| 1 | 2.574 | 0.239 | 1.722 | 2.028 |
| 3a | 2.569 | 0.218 | 1.759 | 2.060 |
| 12 | 2.572 | 0.396 | 1.593 | 2.065 |
| PT-6 | | | | |
| 1 | 2.550 | 0.124 | 1.849 | 2.011 |
| 3a | 2.550 | 0.249 | 1.704 | 2.015 |
| 12 | 2.550 | 0.197 | 1.728 | 2.026 |

TABLE 15-continued

Series (A) Pulse Train Data*

| Electrolyte | P(pre1) (V) | V-Delay (V) | P(1 min) (V) | P(4 min) (V) |
|---|---|---|---|---|
| PT-7 | | | | |
| 1 | 2.528 | 0.163 | 1.701 | 1.874 |
| 3a | 2.528 | 0.264 | 1.591 | 1.898 |
| 12 | 2.526 | 0.152 | 1.780 | 1.972 |
| PT-8 | | | | |
| 1 | 2.414 | 0.033 | 1.677 | 1.654 |
| 3a | 2.414 | 0.112 | 1.589 | 1.668 |
| 12 | 2.392 | 0.058 | 1.683 | 1.701 |
| PT-9 | | | | |
| 1 | 2.194 | 0.000 | 1.444 | 1.364 |
| 3a | 2.192 | 0.000 | 1.467 | 1.408 |
| 12 | 2.165 | 0.127 | 1.300 | 1.369 |

*Average of five cells.

The data in Table 15 indicate that Li/SVO cells activated with quaternary solvent electrolyte 12 presented higher pulse 4 minimum potentials than similar cells having the binary solvent reference electrolyte throughout the test. The cells containing electrolyte 12 presented similar or higher pulse 4 minimum potentials than cells with binary solvent electrolyte 3a. These cells also exhibited higher pulse 1 minimum potentials in most of the pulse trains (pulse trains 1 to 4, 7, and 8). The results were consistent with the order of electrolyte conductivity (FIGS. 1 and 8).

Series (B): The cells were discharged using a 47.5 K-ohm resistor at 37° C. Pulse trains consisting of four 23.3 mA/cm$^2$, 10 second pulses with a 15 second rest after each pulse were applied every 111 days. The test are summarized in Table 16.

TABLE 16

Series (B) Pulse Train Data*

| Electrolyte | P(pre1) | V-Delay (V) | P(1 min) (V) | P(4 min) (V) |
|---|---|---|---|---|
| PT-1 | | | | |
| 1 | 3.231 | 0.001 | 2.560 | 2.479 |
| 3a | 3.234 | 0.017 | 2.608 | 2.554 |
| 12 | 3.231 | 0.005 | 2.609 | 2.540 |
| PT-2 | | | | |
| 1 | 3.188 | 0.165 | 2.407 | 2.464 |
| 3a | 3.187 | 0.275 | 2.348 | 2.529 |
| 12 | 3.189 | 0.139 | 2.472 | 2.504 |
| PT-3 | | | | |
| 1 | 2.972 | 0.256 | 2.166 | 2.326 |
| 3a | 2.968 | 0.365 | 2.082 | 2.366 |
| 12 | 2.982 | 0.208 | 2.235 | 2.343 |
| PT-4 | | | | |
| 1 | 2.684 | 0.173 | 1.720 | 1.901 |
| 3a | 2.673 | 0.357 | 1.385 | 1.791 |
| 12 | 2.691 | 0.080 | 1.965 | 2.054 |

*Average of five cells.

The results shown in Table 16 indicate that in pulse trains 1 to 3, the order of pulse minimum potentials were proportional to the electrolyte conductivity as compared to each groups of cells: 3a>12>1. However, the cells with 3a electrolyte presented greater voltage delay in all pulse trains than those with either reference electrolyte 1 or 12. In pulse train 4, cells with 3a electrolyte presented large voltage delay. They exhibited lower pulse minimum potentials than that of cells with either electrolyte 1 or 12, although electrolyte 3a has the highest conductivity among all three electrolytes.

In contrast, Li/SVO cells with quaternary solvent electrolyte 12 presented the smallest voltage delay and the highest pulse minimum potentials among the three groups of cells. These results provided further support to the conclusion that the quaternary solvent electrolyte 12 containing PC, DME, DIPE and DMC is beneficial to Li/SVO cell performance, especially in long-term pulse discharge test. The novel, beneficial effect of high conductivity is maintained for the quaternary solvent electrolyte activating the Li/SVO cells, but is not demonstrated in the 3a electrolyte.

It is appreciated that various modifications to the present inventive concept may be apparent to those skilled in the art without departing from the spirit and scope of the present invention as defined by the herein appended claims.

What is claimed is:

1. An electrochemical cell, comprising:
  a) a first electrode of a first electrode active material;
  b) a counter electrode of a second electrode active material; and
  c) an electrolyte solution activating the first and second electrodes, the electrolyte comprising:
    i) a linear di-ether as a first solvent;
    ii) a cyclic carbonate as a second solvent;
    iii) a linear carbonate as a third solvent; and
    iv) a linear mono-ether as a fourth solvent.

2. The electrochemical cell of claim 1 wherein the first solvent is selected from the group consisting of 1,2-dimethoxyethane, 1,2-diethoxyethane, 1-ethoxy, 2-methoxyethane, and mixtures thereof.

3. The electrochemical cell of claim 1 wherein the first solvent is present at about 20% to about 70%, by volume.

4. The electrochemical cell of claim 1 wherein the second solvent is selected from the group consisting of propylene carbonate, ethylene carbonate, butylene carbonate, and mixtures thereof.

5. The electrochemical cell of claim 1 wherein the second solvent is present at about 20% to about 40%, by volume.

6. The electrochemical cell of claim 1 wherein the third solvent is selected from the group consisting of dimethyl carbonate, diethyl carbonate, ethyl methyl carbonate, methyl propyl carbonate, ethyl propyl carbonate, dipropyl carbonate, and mixtures thereof.

7. The electrochemical cell of claim 1 wherein the third solvent is present at up to about 45%, by volume.

8. The electrochemical cell of claim 1 wherein the fourth solvent is selected from the group consisting of diethyl ether, ethyl propyl ether, ethyl isopropyl ether, ethyl butyl ether, ethyl tert-butyl ether, dipropyl ether, diisopropyl ether, dibutyl ether, diisobutyl ether, disec-butyl ether, methyl propyl ether, methyl iso-propyl ether, methyl butyl ether, methyl sec-butyl ether, methyl tert-butyl ether, and mixtures thereof.

9. The electrochemical cell of claim 1 wherein the fourth solvent is present at about 5% to about 20%, by volume.

10. The electrochemical cell of claim 1 wherein the electrolyte comprises 1,2-dimethoxyethane, propylene carbonated, dimethyl carbonate and diisopropyl ether.

11. The electrochemical cell of claim 10 wherein the solvents are present in a ratio of about 5:3:1:1, by volume, respectively.

12. The electrochemical cell of claim 1 wherein the electrolyte includes a salt selected from from th egroup consisting of $LiPF_6$, $LiBF_4$, $LiAsF_6$, $LiSbF_6$, $LiClO_4$, $LiO_2$, LiAlCl$_4$, LiGaCl$_4$, LiC(SO$_2$CF$_3$)$_3$, LiN(SO$_2$CF$_3$)$_2$, LiSCN, LiO$_3$SCF$_3$, LiC$_6$F$_5$SO$_3$, LiO$_2$CCF$_3$, LiSO$_6$F, LiB(C$_6$H$_5$)$_4$, LiCF$_3$SO$_3$, and mixtures thereof.

13. The electrochemical cell of claim 1 wherein the first electrode is an anode comprising lithium.

14. The electrochemical cell of claim 1 wherein the counter electrode is a cathode of a cathode active material selected from the group consisting of fluorinated carbon, silver vanadium oxide, copper silver vanadium oxide, Ag$_2$O, Ag$_2$O$_2$, CuF$_2$, Ag$_2$CrO$_4$, MnO$_2$, V$_2$O$_5$, MnO$_2$, TiS$_2$, Cu$_2$S, FeS, FeS$_2$, copper oxide, copper vanadium oxide, and mixtures thereof.

15. The electrochemical cell of claim 1 as a primary cell of either a Li/SVO or a Li/CSVO couple.

16. The electrochemical cell of claim 1 as a secondary cell comprising a carbonaceous anode material and a lithiated cathode active material.

17. The electrochemical cell of claim 16 wherein the carbonaceous anode material is selected from the group consisting of coke, graphite, acetylene black, carbon black, glassy carbon, hairy carbon, hard carbon, and mixtures thereof.

18. The electrochemical cell of claim 16 wherein the lithiated cathode active material is selected from the group consisting of oxides, sulfides, selenides, and tellurides of vanadium, titanium, chromium, copper, molybdenum, niobium, iron, nickel, cobalt and manganese.

19. The electrochemical cell of claim 18 wherein the lithiated oxides are selected from the group consisting of LiNiO$_2$, LiMn$_2$O$_4$, LiCoO$_2$, LiCo$_{0.92}$Sn$_{0.0802}$ and LiCo$_{1-x}$Ni$_x$O$_2$.

20. The electrochemical cell of claim 1 wherein the cathode comprises from about 80 to 99 weight percent of the cathode active material.

21. The electrochemical cell of claim 1 wherein the counter electrode is a cathode comprising at least one of a binder material and conductor additive.

22. The electrochemical cell of claim 21 wherein the binder material is a fluoro-resin powder.

23. The electrochemical cell of claim 21 wherein the conductive additive is selected from the group consisting of carbon, graphite powder, acetylene black and metallic powder selected from the group consisting of titanium, aluminum, nickel and stainless steel, and mixtures thereof.

24. The electrochemical cell of claim 1 associated with an implantable medical device.

25. An electrochemical cell, which comprises:
a) an anode comprising lithium;
b) a cathode comprising silver vanadium oxide; and
c) an electrolyte activating the anode and cathode electrodes, the electrolyte comprising the solvents of: 1,2-dimethoxyethane, propylene carbonate, dimethyl carbonate, and diisopropyl ether.

26. The electrochemical cell of claim 25 wherein, by volume, the 1,2-dimethoxyethan is present at about 20% to 70%, the propylene carbonate is present at about 20% to about 40%, the dimethyl carbonate is present at up to about 45% and the diisopropyl ether is present at about 5% to 20%.

27. The electrochemical cell of claim 25 wherein the solvents are present in a ratio of about 5:3:1:1, by volume, respectively.

28. The electrochemical cell of claim 25 wherein the silver vanadium oxide has the general formula Ag$_x$V$_2$O$_y$ and is present in at least one of its phases selected from the group of β-phase having x=0.35 and y=5.8, γ-phase having x=0.80 and y=5.40, ε-phase having x=1.0 and y=5.5, and mixtures of phases thereof.

29. An electrochemical cell, which comprises:
a) an anode comprising lithium;
b) a cathode comprising copper silver vanadium oxide; and
c) an electrolyte activating the anode and cathode electrodes, the electrolyte comprising the solvents of: 1,2-dimethoxyethane, propylene carbonate, dimethyl carbonate, and diisopropyl ether.

30. The electrochemical cell of claim 29 wherein, by volume, the 1,2-dimethoxyethane is present at about 20% to 70%, the propylene carbonate is present at about 20% to about 40%, the dimethyl carbonate is present at up to about 45% and the diisopropyl carbonate is present at about 5% to 20%.

31. The electrochemical cell of claim 29 wherein the solvents are present in a ratio of about 5:3:1:1, by volume, respectively.

32. The electrochemical cell of claim 29 wherein the copper silver vanadium oxide has the general formula Cu$_x$Ag$_y$V$_2$O$_z$ and wherein $0.01 \leq z \leq 6.5$.

33. The electrochemical cell of claim 32 wherein the copper silver vanadium oxide is present in at least one of its phases selected from the group of Cu$_{0.16}$Ag$_{0.67}$V$_2$O$_z$ with z being about 5.5 and Cu$_{0.5}$Ag$_{0.5}$V$_2$O$_z$ with z being about 5.75.

34. An electrolyte, which comprises:
a) a linear di-ether as a first solvent;
b) a cyclic carbonate as a second solvent;
c) a linear carbonate as a third solvent; and
d) a linear mono-ether as a fourth solvent.

35. The electrolyte of claim 34 the first solvent is selected from the group consisting of 1,2-dimethoxyethane, 1,2-diethoxyethane, 1-ethoxy, 2-methoxyethane, and mixtures thereof.

36. The electrolyte of claim 34 wherein the second solvent is selected from the group consisting of propylene carbonate, ethylene carbonate, butylene carbonate, and mixtures thereof.

37. The electrolyte of claim 34 wherein the third solvent is selected from the group consisting of dimethyl carbonate, diethyl carbonate, ethyl methyl carbonate, methyl propyl carbonate, ethyl propyl carbonate, dipropyl carbonate, and mixtures thereof.

38. The electrolyte of claim 34 wherein the fourth solvent is selected from diethyl ether, ethyl propyl ether, ethyl isopropyl ether, ethyl butyl ether, ethyl tert-butyl ether, dipropyl ether, diisopropyl ether, dibutyl ether, diisobutyl ether, disec-butyl ether, methyl propyl ether, methyl isopropyl ether, methyl butyl ether, methyl sec-butyl ether, methyl tert-butyl ether, and mixtures thereof.

39. The electrolyte of claim 34 wherein, by volume, the first solvent is 1,2-dimethoxyethane present at about 20% to about 70%, the second solvent is propylene carbonate present at about 20% to about 40%, the third solvent is dimethyl carbonate present at up to about 45%, and the fourth solvent is diisopropyl ether present at about 5% to about 20%.

40. The electrolyte of claim 34 wherein the solvents are present in a ratio of about 5:3:1:1, by volume, respectively.

41. A method for providing electrochemical energy, comprising the steps of:
a) providing a first electrode of a first electrode active material;
b) providing a counter electrode of a second electrode active material;
c) electrically associating the first electrode with the counter electrode housed in a casing;

d) activating the first electrode and the counter electrode with an electrolyte provided in the casing, the electrolyte comprising:
  i) a linear di-ether as a first solvent;
  ii) a cyclic carbonate as a second solvent;
  iii) a linear carbonate as a third solvent; and
  iv) a linear mono-ether as a fourth solvent; and
e) discharging the thusly constructed cell to provide the electrical energy.

42. The method of claim 41 wherein including selecting the first solvent from the group consisting of 1,2-dimethoxyethane, 1,2-diethoxyethane, 1-ethoxy, 2-methoxyethane, and mixtures thereof.

43. The method of claim 42 wherein the first solvent is present at about 20% to about 70%, by volume.

44. The method of claim 41 including selecting the second solvent from the group consisting of propylene carbonate, ethylene carbonate, butylene carbonate, and mixtures thereof.

45. The method of claim 44 wherein the second solvent is present at about 20% to about 40%, by volume.

46. The method of claim 41 including selecting the third solvent from the group consisting of dimethyl carbonate, diethyl carbonate, ethyl methyl carbonate, methyl propyl carbonate, ethyl propyl carbonate, dipropyl carbonate, and mixtures thereof.

47. The method of claim 46 wherein the third solvent is present at up to about 45%, by volume.

48. The method of claim 41 including selecting the fourth solvent from the group consisting of diethyl ether, ethyl propyl ether, ethyl isopropyl ether, ethyl butyl ether, ethyl tert-butyl ether, dipropyl ether, diisopropyl ether, dibutyl ether, diisobutyl ether, disec-butyl ether, methyl propyl ether, methyl iso-propyl ether, methyl butyl ether, methyl sec-butyl ether, methyl tert-butyl ether, and mixtures thereof.

49. The method of claim 48 wherein the fourth solvent is present at about 5% to about 20%, by volume.

50. The method of claim 41 wherein the electrolyte comprises 1,2-dimethoxyethane, propylene carbonate, dimethyl carbonate and diisopropyl ether.

51. The method of claim 41 wherein the solvents are present in a ratio of about 5:3:1:1, by volume, respectively.

52. The method of claim 41 including discharging the cell to deliver at lease one current pulse of a short duration burst of electrical current of a significantly greater amplitude than that of a prepulse current immediately prior to the pulse.

53. The method of claim 52 including discharging the cell to deliver a pulse train of at least two current pulses delivered in succession with or without an open circuit period between the pulses.

54. The method of claim 53 wherein the current pulses is of about 15 mA/cm$^2$ to about 50 mA/cm$^2$.

* * * * *

UNITED STATES PATENT AND TRADEMARK OFFICE
CERTIFICATE OF CORRECTION

PATENT NO. : 6,844,115 B2
DATED : January 18, 2005
INVENTOR(S) : Hong Gan et al.

It is certified that error appears in the above-identified patent and that said Letters Patent is hereby corrected as shown below:

Column 22,
Lines 60-61, "propylene carbonated" should read -- propylene carbonate --;
Line 66, "from the egroup" should read -- from the group --;

Column 23,
Line 30, "$LiCo_{0.92}Sn_{0.0802}$" should read -- $LiCo_{0.92}Sn_{0.08}O_2$ --;
Line 55, "1,2-dimethoxyethan" should read -- 1,2-dimethoxyethane --;

Column 24,
Line 31, after "the electrolyte of claim 34", please insert -- wherein --;
Line 33, "1-ethoxy, 2-methoxyethane" should read -- 1-ethoxy,2-methoxyethane --;

Column 25,
Line 10, "wherein including" should read -- including --; and

Column 26,
Line 17, "lease" should read -- least --.

Signed and Sealed this

Twenty-fourth Day of May, 2005

JON W. DUDAS
*Director of the United States Patent and Trademark Office*